United States Patent [19]

Weaver et al.

[11] Patent Number: 5,372,864
[45] Date of Patent: Dec. 13, 1994

[54] TONERS FOR POLYESTERS

[75] Inventors: Max A. Weaver; Wayne P. Pruett, both of Kingsport; Gerry Rhodes, Piney Flats; Samuel D. Hilbert, Jonesborough; William W. Parham, Kingsport, all of Tenn.

[73] Assignee: Eastman Chemical Company, Kingsport, Tenn.

[21] Appl. No.: 116,419

[22] Filed: Sep. 3, 1993

[51] Int. Cl.$^5$ .............. B29D 23/00; C08G 69/44
[52] U.S. Cl. .............. 428/36.92; 528/272; 528/288; 528/289; 528/290; 528/291; 528/292; 528/298; 528/299; 528/302; 528/307; 528/308; 525/437; 525/442; 525/444; 525/471; 430/109; 428/35.7
[58] Field of Search .............. 528/272, 288, 289, 290, 528/291, 292, 298, 299, 302, 307, 308; 525/437, 444, 442, 471; 430/109; 428/35.7, 36.92

[56] References Cited

U.S. PATENT DOCUMENTS

| | | | |
|---|---|---|---|
| 2,731,476 | 1/1956 | Peter et al. | 552/259 |
| 3,488,195 | 1/1970 | Hunter | 96/84 |
| 3,849,139 | 11/1974 | Hibino et al. | 96/84 R |
| 3,918,976 | 11/1975 | Arai et al. | 96/84 R |
| 4,359,570 | 11/1982 | Davis et al. | 528/289 |
| 4,403,092 | 9/1983 | Davis et al. | 528/290 |
| 4,420,581 | 12/1983 | McFarlane et al. | 524/431 |
| 4,740,581 | 4/1988 | Pruett et al. | 528/289 |
| 4,745,174 | 5/1988 | Pruett et al. | 528/289 |
| 4,999,418 | 3/1991 | Krutak et al. | 528/272 |

Primary Examiner—Samuel A. Acquah
Attorney, Agent, or Firm—Bernard J. Graves, Jr.

[57] ABSTRACT

This invention provides certain blue substituted 1,4-bis(2,6-dialkylanilino) anthraquinones in combination with selected red anthraquinone and anthrapyridone (3H-dibenz[f,ij] isoquinoline-2,7-dione) compounds which provide a toner system useful in imparting a desirable neutral to slightly blue hue to polyesters having a yellow appearance. The thermally stable colored compounds can have polyester reactive groups and are preferably incorporated into the polyester polymer structure during polymerization.

15 Claims, No Drawings

TONERS FOR POLYESTERS

FIELD OF THE INVENTION

This invention belongs to the field of organic chemistry. In particular, this invention relates to certain substituted 1,4-bis(2,6-dialkylanilino) anthraquinones in combination with certain red anthraquinone and anthrapyridone (3H-dibenz[f,ij] isoquinoline-2,7-dione) compounds which are useful as a toner system in polyesters.

BACKGROUND OF THE INVENTION

Unfortunately, native polyester fibers and plastics as manufactured generally have an undesirable yellow appearance. At present, in order to improve the apparent whiteness of polyester fibers or neutral color characteristics of polyester plastics, certain so-called toners are incorporated into the polyester to hide or neutralize the yellow color.

Cobalt acetate is one of the most widely used toners in the industry to mask the yellow color of polymers. However, cobalt acetate has a number of noteworthy disadvantages. For example, cobalt acetate toned materials tend to be unstable during storage and are particularly susceptible to temperature and humidity, and tends to undergo an undesirable color shift toward yellow. Further, when high cobalt concentrations are needed to mask the yellow color of some polymers there is a tendency to impart a gray color to the polymer.

Another disadvantage in the use of cobalt acetate is the limitation set by various governmental agencies in the level of cobalt deemed allowable in polyester catalyst systems.

Further, cobalt salts tend to lower the resulting polymer's thermal stability and increases acetaldehyde formation in poly(ethylene terephthalate).

Lastly, cobalt has a strong tendency to form insoluble residues in manufacturing process equipment, thereby leading to production problems.

U.S. Pat. No. 4,745,174, discloses certain 1-cyano-3H-dibenz[f,ij] isoquinoline-2,7-diones which are useful as organic toners for polyester fibers and plastics and which solve many of the aforementioned problems. These compounds, however, are expensive to manufacture and provide environmental, safety, and provide toxicological concerns relative to their manufacture and use.

Suitable toners for polyester must be non-extractable from the polymer to provide the greatest degree of safety. Also, they must be stable to sunlight and to a wide range of conditions of temperature and humidity. Further, they must not sublime or change hue as a result of the extremely high temperatures encountered during the polyester manufacture. In addition, the toner must have no adverse effects on the physical properties of the polyester polymer.

U.S. Pat. Nos. 3,488,195 and 3,849,139 disclose the use of certain 1,4-bis-(arylamino)anthraquinones including 1,4-bis(2,6-dialkylanilino) anthraquinones for blue tinting photographic X-ray film to aid in the examination of the X-ray patterns obtained therein for obtaining accurate diagnosis of complex radiographs. No mention that these blue compounds would be particularly efficacious in combination with certain red colorants as toners to overcome the inherent yellow characteristics of polyesters is made, however, in either patent.

U.S. Pat. No. 2,731,476 teaches the use of certain blue 1,4-bis(2,6-dialkylanilino) anthraquinone sulfonamide derivatives as dyestuffs and pigments for coloring lacquers and plastic masses.

Finally, U.S. Pat. Nos. 4,359,570; 4,403,092; 4,420,581; 4,790,581; 4,740,581; and 4,999,418 disclose colored polyester compositions containing varying levels of the blue and red colorants useful in the practice of this invention copolymerized therein; however, no mention is made in these patents regarding the potential utility of the disclosed compounds as components to produce an efficacious toner system for polyesters.

SUMMARY OF THE INVENTION

This invention provides certain blue substituted 1,4-bis(2,6-dialkylanilino) anthraquinones in combination with selected red anthraquinone and anthrapyridone (3H-dibenz[fi,j] isoquinoline-2,7-dione) compounds which provide a toner system useful in imparting a desirable neutral to slightly blue hue to polyesters having a yellow appearance. The thermally stable colored compounds have reactive groups and can be incorporated into the polyester polymer structure during polymerization.

DETAILED DESCRIPTION OF THE INVENTION

This invention provides an economical, safe, and environmentally compatible toner system for use in polyester fibers and plastics. The toners have adequate color characteristics (hue) and are stable to heat, light, humidity and a variety of environmental factors and overcome many of the problems encountered with the known toner systems mentioned above. The toners of this invention have been shown to be stable to UV light, elevated temperatures, glycolysis and hydrolysis. Further, the ratio of red and blue components may be varied as needed in obtaining the color characteristics which are needed in the toner systems to provide effective toner properties for different polyesters having a variable amount of yellow color which also may vary in hue.

A major portion of the toner system used in this invention is comprised of at least one blue 1,4-bis(2,6-dialkylanilino) anthraquinone(s) of formula (I):

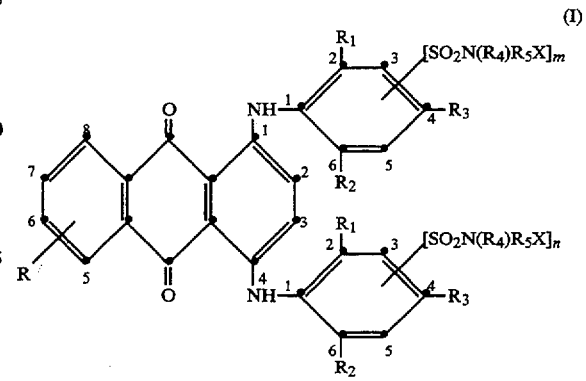

wherein:

R is selected from the group consisting of hydrogen, $C_1-C_6$ alkyl, halogen, carboxy, and

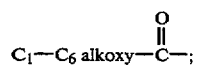

$R_1$ and $R_2$ are independently $C_1$–$C_6$-alkyl;

$R_3$ is selected from the group consisting of hydrogen, halogen, $C_1$–$C_6$-alkyl, substituted $C_1$–$C_6$ alkyl, hydroxy, $C_1$–$C_6$-alkoxy, substituted $C_1$–$C_6$-alkoxy, cyano, thiocyano, $C_1$–$C_6$-alkylthio, substituted $C_1$–$C_6$-alkylthio, $C_1$–$C_6$-alkylsulfonyl, substituted $C_1$–$C_6$-alkylsulfonyl, $C_1$–$C_6$-alkoxycarbonyl, carboxy, aryloxy, arylthio, arylsulfonyl, and $SO_2N(R_4)R_5X$ when m and/or n are zero;

$R_4$ is selected from the group consisting of hydrogen, $C_1$–$C_6$-alkyl, substituted $C_1$–$C_6$-alkyl, $C_3$–$C_8$-alkenyl, $C_3$–$C_8$-alkynyl, $C_3$–$C_7$-cycloalkyl and aryl;

$R_5$ is a linking group selected from the group consisting of $C_1$–$C_8$-alkylene, $C_1$–$C_6$-alkylene-Z—$Z_1$–$C_6$-alkylene, arylene-$C_1$–$C_6$-alkylene, arylene-Z—$Z_1$–$C_6$-alkylene, $C_3$–$C_7$-cycloalkylene, $C_1$–$C_6$-alkylene-cycloalkylene-$C_1$–$C_6$-alkylene, $C_1$–$C_6$-alkylene-arylene-$C_1$–$C_6$-alkylene, and $C_1$–$C_6$-alkylene-Z-arylene-Z—$Z_1$–$C_6$-alkylene, wherein Z is selected from —O—, —S— or $SO_2$;

X is hydrogen or a polyester reactive group; and m and n are independently 0 or 1; with the proviso that at least one polyester reactive group is present.

The red components which may be blended with blue components of formula I above have the following structural formulae II-X:

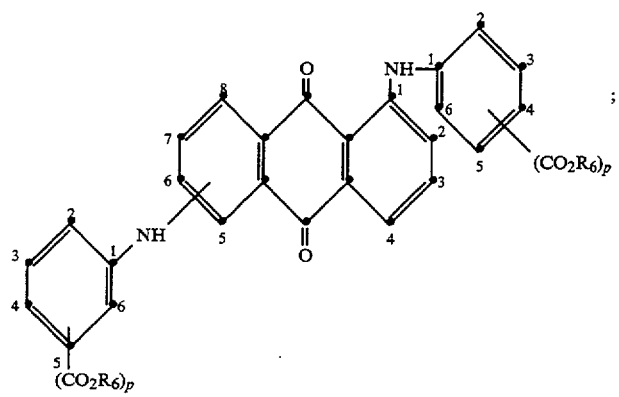

II

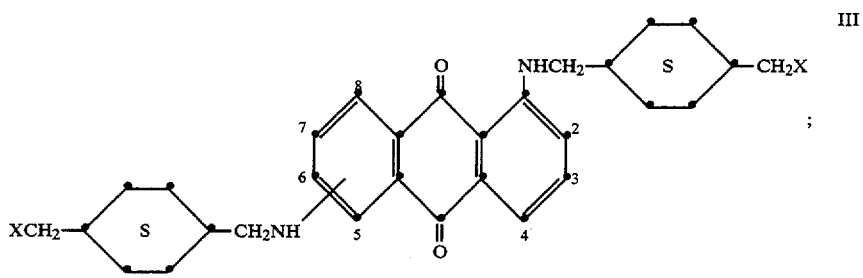

III

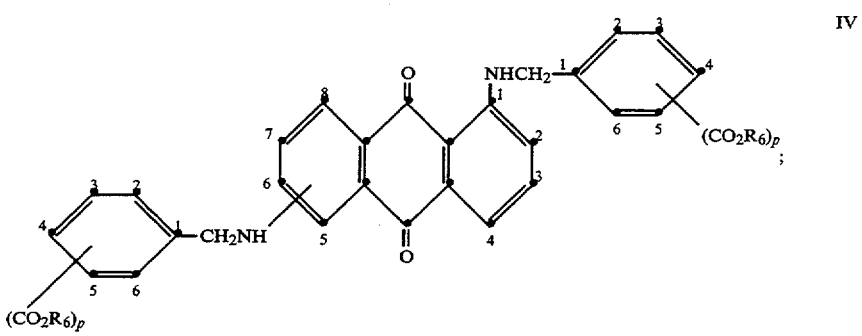

IV

-continued
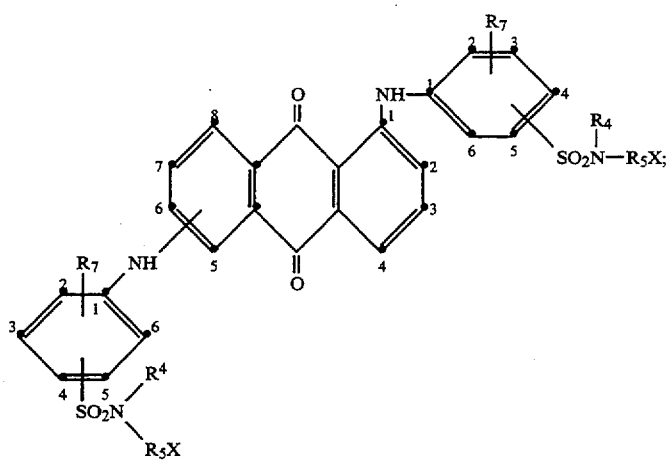
V
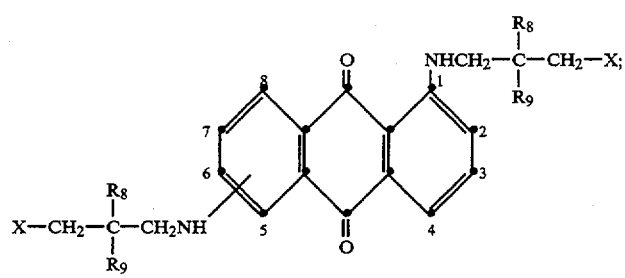
VI
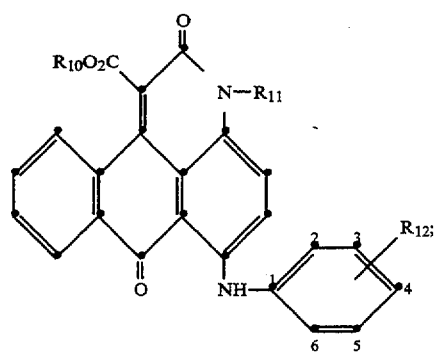
VII
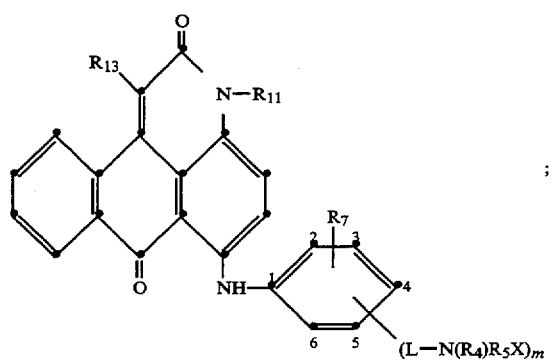
VIII

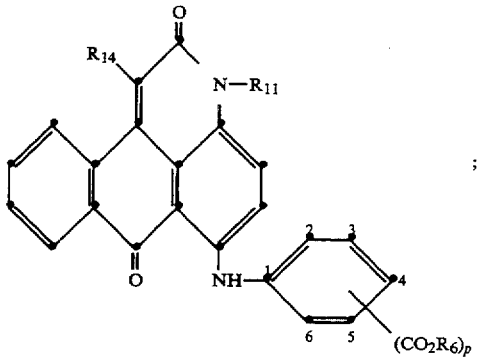

and

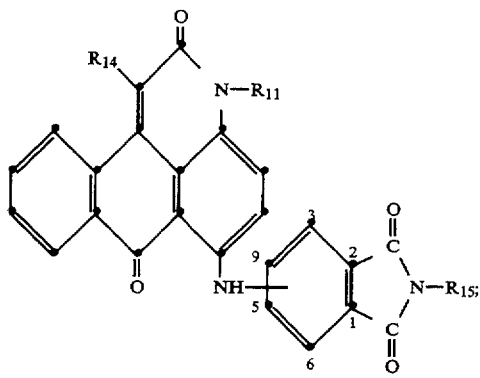

wherein:

$R_6$ is selected from the group consisting of hydrogen, $C_1$–$C_6$-alkyl, substituted $C_1$–$C_6$-alkyl, $C_3$–$C_7$-cycloalkyl or aryl;

$R_7$ is hydrogen or one to three groups selected from $C_1$–$C_6$-alkyl, substituted $C_1$–$C_6$ alkyl, $C_1$–$C_6$-alkanoylamino, halogen, hydroxy, $C_1$–$C_6$-alkyl $C_1$–$C_6$-alkoxy, $C_1$–$C_6$-alkylthio;

$R_8$ and $R_9$ are the same or different and are selected from the group consisting of $C_1$–$C_6$-alkyl, substituted $C_1$–$C_6$-alkyl, $C_3$–$C_7$-cycloalkyl or aryl;

$R_{10}$ is selected from the group consisting of $C_1$–$C_6$-alkyl, $C_3$–$C_7$-cycloalkyl or aryl;

$R_{11}$ is selected from the group consisting of hydrogen, $C_1$–$C_{12}$-alkyl, substituted $C_1$–$C_{12}$-alkyl, $C_3$–$C_7$-cycloalkyl and aryl;

$R_{12}$ is hydrogen or one to three groups selected from the group consisting of $C_1$–$C_6$-alkyl, substituted $C_1$–$C_6$-alkyl, $C_1$–$C_6$-alkoxy, substituted $C_1$–$C_6$-alkoxy, $C_1$–$C_6$-alkylthio, substituted $C_1$–$C_6$-alkylthio, halogen, hydroxy, $C_1$–$C_6$-alkanoylamino, aroylamino, $C_1$–$C_6$-alkylsulfonylamino and arylsulfonylamino;

$R_{13}$ and $R_{14}$ are selected from hydrogen, cyano or $CO_2R_{10}$;

$R_{15}$ is $R_4$ or $R_5X$ as previously defined;

L is —CO— or —SO$_2$—; X is as previously defined; m is 0 or 1; p is 1 or 2; with the provisos that $R_{13}$ is hyrogen when m is 0 and at least one polyester reactive group is present.

The term "polyester reactive group" is used herein to describe a group which is reactive with at least one of the functional groups from which the polyester is prepared under polyester forming conditions. Examples of the groups which X may represent include hydroxy, carboxy, an ester group, amino, $C_1$–$C_6$-alkylamino, etc.

The ester radicals may be any radical having the formulae

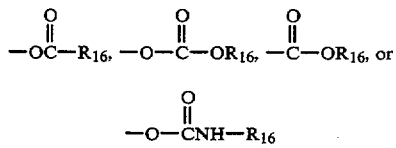

$$-O-\overset{O}{\underset{\|}{C}}NH-R_{16}$$

wherein $R_{16}$ is selected from the group consisting of $C_1$–$C_6$-alkyl, substituted $C_1$–$C_6$-alkyl, $C_3$–$C_7$-cycloalkyl or aryl. Reactive group X is preferably hydroxy, carboxy, $C_1$–$C_2$-alkoxycarbonyl or acetoxy.

In the terms "substituted $C_1$–$C_6$-alkyl", "substituted $C_1$–$C_{12}$-alkyl", "substituted $C_1$–$C_6$-alkoxy", "substituted $C_1$–$C_6$-alkylthio", "substituted $C_1$–$C_6$-alkylsulfonyl", "$C_1$–$C_6$-alkylsulfonylamido", "substituted alkylene", "$C_1$–$C_6$-alkoxycarbonyl", the alkyl and alkylene groups or portions of the groups may contain as further substituents one or more groups, preferably one to three groups selected from the group consisting of hydroxy, halogen, cyano, aryl, aryloxy, arylthio, $C_1$–$C_4$-alkylthio, $C_1$–$C_4$-alkylthio, $C_3$–$C_7$-cycloalkyl, $C_1$–$C_4$-alkanoyloxy and —($-O-R_{17}-$)$_p$–$R_{18}$, wherein $R_{17}$ is selected from the group consisting of $C_1$–$C_6$-alkylene, $C_1$–$C_6$-alkylenearylene, cyclohexylene, arylene, and $C_1$–$C_6$-alkylenecyclohexylene; $R_{18}$ is selected from the group consisting of hydrogen, hydroxy, carboxy, $C_1$–$C_4$-alkanoyloxy, $C_1$–$C_4$-alkoxycarbonyl, aryl, and $C_3$–$C_7$-cycloalkyl; and $p$ is 1, 2, 3, or 4.

The term "aryl" as used herein preferably denotes phenyl and phenyl substituted with one to three substituents selected from the group consisting of $C_1$–$C_6$-alkyl, $C_1$–$C_6$-alkoxy, halogen, carboxy, cyano, $C_1$–$C_6$- alkylthio, $C_1$–$C_6$-alkylsulfonyl, trifluoromethyl, hydroxy, $C_1$–$C_6$-alkanoyloxy, $C_1$–$C_6$-alkanoylamino, and $C_1$–$C_6$-alkoxycarbonyl.

The term "arylene" includes 1,2-, 1,3- and 1,4-phenylene and such radicals substituted one to three times with $C_1$–$C_6$-alkyl, $C_1$–$C_6$-alkoxy, $C_1$–$C_6$-alkoxycarbonyl, or halogen.

The terms "$C_3$–$C_8$-alkenyl" and "$C_3$–$C_8$-alkynyl" are used to denote aliphatic hydrocarbon moieties having 3–8 carbons and containing at least one carbon-carbon double bond and one carbon-carbon triple bond, respectively.

The term "halogen" is used to indicate bromine, chlorine, fluorine, and iodine.

The terms "$C_1$–$C_6$-alkanoyloxy" and "$C_1$–$C_6$-alkanoylamino" are used to represent radicals of the formulae

respectively, wherein $R_{19}$ is a straight or branched chain $C_1$–$C_6$-alkyl radical and $R_6$ is as defined above.

Thus, the present invention provides a molding or fiber grade polyester having copolymerized therein, in an amount sufficient to improve the apparent whiteness of the polyester, a blue 1,4-bis(2,6-dialkylanilino) anthraquinone compounds of Formula (I) plus a red anthraquinone or anthrapyridone compounds of formulae (II)–(X) above. In this regard, the blue and red compounds will not be present in an amount sufficient to impart a substantial amount of color to the polyester.

As a further aspect of the present invention there is provided a method for imparting whiteness to a polyester normally appearing yellow, which comprises copolymerizing in said polyester at least one blue 1,4-bis(2,6-dialkylanilino) anthraquinone compound of formula (I), along with a red anthraquinone or anthrapyridone compound of formulae II–X above.

As noted above, the toner blends of the present invention can be added before or during polymerization. Accordingly, as a further aspect of the present invention, there is provided a premix composition comprising a blend at least one blue 1,4-bis(2,6-dialkylanilino) anthraquinone compound of formula (I), along with a red anthraquinone or anthrapyridone compound of formulae (II)–(X) above. The premix composition may be a neat blend of the red and blue compounds or the composition may be pre-dissolved in one of the polyester's monomeric species, e.g., ethylene glycol.

The total amount of toner components added depends, of course, on the amount of inherent yellow color in the polyester. Generally, a maximum concentration of about 10 ppm of combined toner components and a minimum concentration of about 0.5 ppm are required with about 1–7 ppm of blue component (I) in combination with about 0.5–3 ppm of red components of formulae (II–X) being preferred.

In a preferred embodiment of the present invention, the blue anthraquinone compound corresponds to structure (I) above, wherein R is hydrogen; $R_1$ and $R_2$ are independently selected from methyl and ethyl; $R_3$ is hydrogen, methyl, or bromo; $R_4$ is hydrogen, $C_1$–$C_4$-alkyl or aryl; $R_5$ is selected from the group consisting of $C_1$–$C_6$-alkylene, $C_1$–$C_4$-alkylene-O—$C_1$–$C_4$-alkylene, —$CH_2C_6H_{10}CH_2$—, arylene, or —$CH_2$-arylene- and the red component corresponds to formula (V), wherein $R_7$ is $C_1$–$C_6$-alkoxy and $R_4$ and $R_5$ are as defined above for the preferred blue component (I).

In an especially preferred embodiment of the present invention, the blue compound of formula (I) is

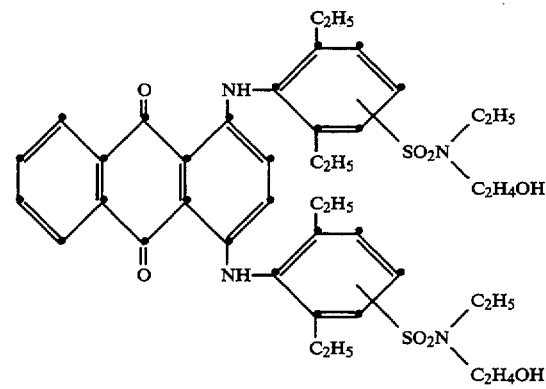

and the red compound of formula (V) is

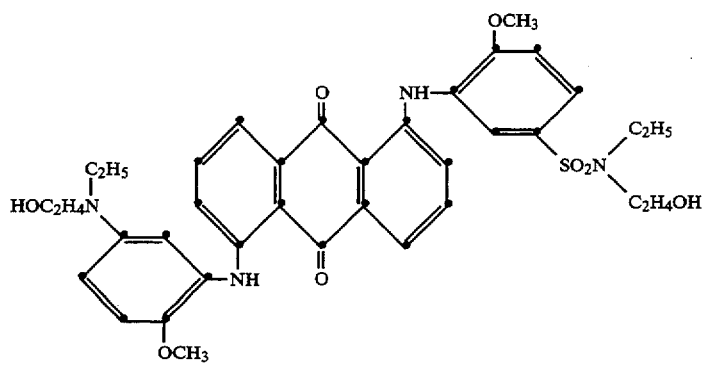

The blue anthraquinones of formula (I) can be prepared in general by reaction of leuco quinizarin (1,4,9,10-tetrahydroxyanthracene) compounds with an excess aromatic amines, preferably in the presence of acid catalysts such as boric acid as described in U.S. Pat. No. 3,918,976, incorporated herein by reference and as follows:

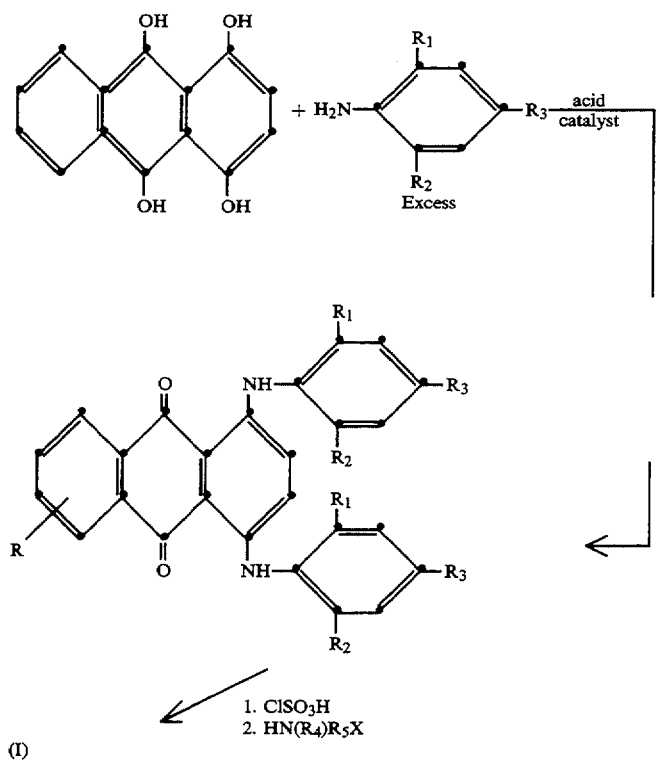

(I)

The 1,4-bis(2,6-dialkylanilino)anthraquinone compounds thus produced are readily functionalized if needed by first chlorosulfonating with chlorosulfonic acid to produce di-sulfonyl chlorides which can be reacted with amines containing polyester reactive groups, the general method being disclosed in U.S. Pat. No. 2,731,476, incorporated herein by reference.

Typical amines corresponding to formula HN(R$_4$)R$_5$X include 2-aminoethanol, 2,2-iminodiethanol, 1-amino-2,3-propandiol, 2-methylaminoethanol, 2-ethylaminoethanol, 2-anilinoethanol, methyl anthranilate, methyl m-amino benzoate, p-aminobenzoic acid, m-aminophenol, 6-aminohexanoic acid, β-alanine, glycine ethyl ester, 2-(p-aminophenyl)ethanol, 2-(p-aminophenoxy)ethanol 4-aminomethylcyclohexane methanol and 3-amino-2,2-dimethyl-1-propanol.

Red compounds (II) can be prepared by reacting 1,5-dichloroanthraquinone and/or 1,8-dichloroanthraquinone or mixtures thereof with o, m- and p-aminobenzoic acids (and esters thereof) by a modified Ullmann reaction involving nitrogen arylation of the anilines in the presence of copper catalysts (see U.S. Pat. No. 4,359,580, incorporated herein by reference).

Red compounds of formula (III) can be prepared as described in U.S. Pat. No. 4,420,581 and compounds of formula (VI) can be prepared as in U.S. Pat. No. 4,999,418, incorporated herein by reference.

Red anthraquinone compounds of formula (IV) can be prepared by reacting 1,5-dichloroanthraquinone and 1,8-dichloroanthraquinone or mixtures thereof with substituted benzyl amines by procedures similar to those used in preparing compounds of formulae (III) and (VI).

Red anthrapyridone compounds (VII) can be prepared as disclosed in U.S. Pat. No. 4,790,581 incorporated herein by reference; procedures useful in preparing red-violet anthrapyridone compounds (VIII) and (IX) are disclosed in U.S. Pat. No. 4,745,174, incorporated herein by reference.

The polyesters referred to herein include linear, thermoplastic, crystalline or amorphous polyesters produced by conventional polymerization techniques from one or more diols and one or more dicarboxylic acids. The polyesters normally are molding or fiber grade and have an inherent viscosity (I.V.) of about 0.4 to about 1.2 (dL/g) measured at 25° C. in a 60/40 ratio by weight of phenol/tetrachloroethane.

Suitable diol components of the described polyesters may be selected from ethylene glycol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, Z,8-bis(hydroxymethyl)-tricyclo-[5.2.1.0]-decane wherein Z represents 3, 4, or 5; and diols containing one or more oxygen atoms in the chain, e.g., diethylene glycol, triethylene glycol, dipropylene glycol, tripropylene glycol and the like. In general, these diols contain 2 to 18, preferably 2 to 8 carbon atoms. Cycloaliphatic diols can be employed in their cis or trans configuration or as mixtures of both forms.

Suitable acid components (aliphatic, alicyclic, or aromatic dicarboxylic acids) of the linear polyester are selected, for example, from terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalenedicarboxylic acid and the like. In the polymer preparation, it is often preferable to use a functional acid derivative thereof such as the dimethyl, diethyl, or dipropyl ester of the dicarboxylic acid. The anhydrides or acid halides of these acids also may be employed where practical.

Preferred polyesters comprise at least about 50 mole percent terephthalic acid residues and at least about 50 mole percent ethylene glycol and/or 1,4-cyclohexanedimethanol residues and about 2 to about 8 mole percent of residues of a compound of formula (1). Particularly preferred polyesters are those containing from about 75 to 100 mole percent terephthalic acid residues and from about 75 to 100 mole percent ethylene glycol residues.

The linear polyesters may be prepared according to polyester forming conditions well known in the art. For example, a mixture of one or more dicarboxylic acids, preferably aromatic dicarboxylic acids, or ester forming derivatives thereof, and one or more diols may be heated in the presence of esterification and/or polyesterification catalysts at temperatures in the range of about 150° to about 300° C., and pressures of atmospheric to about 0.2 mm Hg. Normally, the dicarboxylic acid or derivative thereof is esterified or transesterified with the diol(s) at atmospheric pressure and at a temperature at the lower end of the specified range. Polycondensation then is effected by increasing the temperature and lowering the pressure while excess diol is removed from the mixture.

Typical catalyst or catalyst systems for polyester condensation are well-known in the art. For example, catalysts disclosed in U.S. Pat. Nos. 4,025,492; 4,136,089; 4,176,224; 4,238,593; and 4,208,527, incorporated herein by reference, are deemed suitable in this regard. Further, R. E. Wilfong, *Journal of Polymer Science*, 54 385 (1961) sets forth typical catalysts which are useful in polyester condensation reactions.

A preferred temperature range for a polyester condensation is about 260° C. to about 300° C.

The following detailed procedures will illustrate further the preparation of the toner components and the tabular examples of Tables 1–10 provide a further description of the blue and red compounds which are useful in the practice of the invention.

EXPERIMENTAL SECTION

The chlorosulfonyl compound of Example 1 and other examples can also be prepared by the process described in copending application Ser. No. 08/116,435, filed on this date. In this process, the reaction mixture is drowned in a $C_3$-$C_6$ aliphatic ketone, or a mixture of $C_3$-$C_6$ aliphatic ketones, with stirring and cooling to precipitate the solid arylsulfonyl halide thus produced. Acetone is the preferred $C_3$-$C_6$ aliphatic ketone. In this process, less heat of reaction is observed, thus making the drowning of the halosulfonation reaction mixture safer and more controllable. Further, less hydrogen chloride gas is evolved from the drowning mixture and generally more highly pure arylsulfonyl chlorides are produced.

Example 1

To chlorosulfonic acid (250 mL) was added portionwise with stirring 1,4-bis-(2-ethyl-6-methylanilino) anthraquinone (50.0 g, 0.11 m) at such a rate that the temperature rose from 25° C. to about 45° C. The resulting solution was stirred without heating for 2.0 hours and then added in a fine stream to ice-water mixture (3.0L) at 0°–5° C. with good stirring. The di-sulfonyl chloride product was collected by filtration, washed with water, pressed to remove most of the water and then added to tetrahydrofuran (1.0L) and stirred to solution. Ethanolamine (30.0 g, 0.5 mole) was dissolved in tetrahydrofuran (50.0 mL) and the solution added dropwise to the solution of the di-sulfonyl chloride with stirring. After being stirred at room temperature for about 12.0 hours, the tetrahydrofuran was removed under about 100 inches of pressure. The residue was then dissolved in acetic acid (500 mL) and the solution drowned slowly into water (3.5L) with stirring. The blue product was collected by filtration, washed with hot water and dried (yield 77.5 g, 97.7% of the theoretical yield). Mass spectrometry supported the following structure:

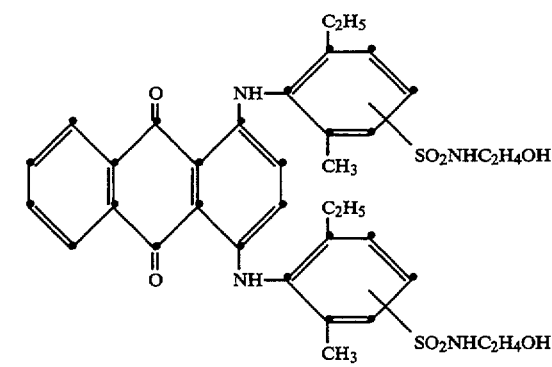

Absorption maxima were observed at 578 nm ($\epsilon$—15,694) and 621 nm ($\epsilon$—16,817) in the visible absorption spectrum in N,N-dimethylformamide solvent.

Example 2

An anthraquinone di-sulfonyl chloride produced by chlorosulfonation of 1,4-bis(2-ethyl-6-methylanilino)anthraquinone (0.051 m) exactly as described in Example 1, was added to a slurry of 4-carbomethoxybenzyl amine-HCl (22.3 g, 0.111 m) in methylene chloride (250 mL) to which triethyl amine (26.3 g, 0.260 m) had been added. After the reaction mixture had been stirred at room temperature, activated charcoal (5.0 g) and magnesium sulfate (5.0 g) were added and the mixture then filtered to remove the solids. The solvent was removed from the filtrate under vacuum and the residue slurried in about 500 mL of water. Essentially a quantitative yield of product was obtained which had the following structure as evidenced by mass spectrometry.

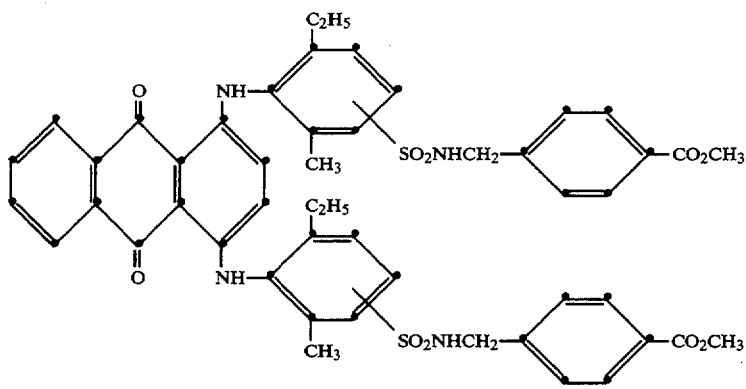

Absorption maxima at 597 nm (ε—11,971) and 622 nm (ε—15,126) in the visible absorption spectrum in methylene chloride.

Example 3

An anthraquinone di-sulfonyl chloride, produced by chlorosulfonation of 1,4-bis(2-ethyl-6-methylanilino)anthraquinone (0.037 m) exactly as described in Example 1 was reacted with ethyl glycinate HCl (10.78 g, 0.077 m) exactly as described in Example 2 to produce 29.5 g (99.0% of the theoretical yield) of the following blue product:

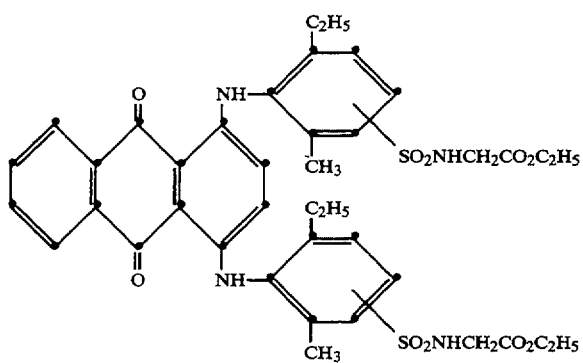

Absorption maxima at 577 nm (ε—14,713) and 621 nm (ε—15,517) were observed in the visible absorption spectrum in methylene chloride.

Example 4

To o-dichlorobenzene (100 mL) was added 1,4-bis-(2-ethyl-6-methylanilino)anthraquinone (9.48 g, 0.02 m) with stirring. After solution appeared to be complete, bromine (7.04 g, 0.044 m), dissolved in o-dichlorobenzene (20 mL), was added dropwise at 25°-30° C. (very slight exotherm). After addition was complete, the reaction mixture was heated at 25°-30° for 1.0 hour, allowed to cool to room temperature and then drowned into methanol (500 mL). The product crystallized and was collected by filtration, washed with methanol and dried in air. The yield was 9.44 g (74.7% of the theoretical yield) of the following dibrominated material as confirmed by mass spectrometry:

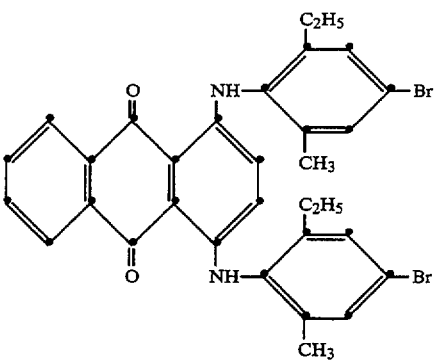

Absorption maxima at 582 nm (ε—16,953) and 625 nm (ε—16,953) were observed in the visible absorption spectrum in methylene chloride.

Example 5

To chlorosulfonic acid (35.0 mL) was added portionwise, at less than 35° C., 1,4-bis-(4-bromo-2-ethyl-6-methylanilino) anthraquinone (6.32 g, 0.01 m) (from Example 4) with good stirring. Chlorosulfonation was completed by heating and stirring the reaction solution at about 90°-95° C. for 1.0 hour, which was then drowned gradually into about 500 mL of ice/water mixture with stirring. The blue di-sulfonyl chloride was collected by filtration and pressed fairly dry. The wet-press cake was then added to ethanolamine (50.0 mL) and the reaction mixture stirred at 90°-95° C. for 0.5 hour and then drowned into water (300 mL). After being acidified to pH of less than 4, the mixture was filtered and the solid washed with water and dried in air. Thin-layer chromatography showed, in addition to the desired product, some highly polar material presumed to be the mono or di-sulfonic acid, or mixture thereof. Purification was accomplished by dissolving a portion (1.0 g) of the crude product in methylene chloride (40 mL) followed by chromatography through MgO$_3$Si (FLORISIL) in a coarse glass-fritted funnel using methylene chloride to remove a small amount of blue material which had a high R$_f$ value (appeared to be starting material). The product was then eluted using tetrahydrofuran. The solvent was then removed from the eluate to leave an oily residue which was dissolved in acetic acid (10 mL) and the solution was then drowned into water. The blue product was collected by filtration, washed with water and dried in air (yield 0.6 g). Mass spectrometry and thin-layer chromatography showed the product to be mostly the desired product:

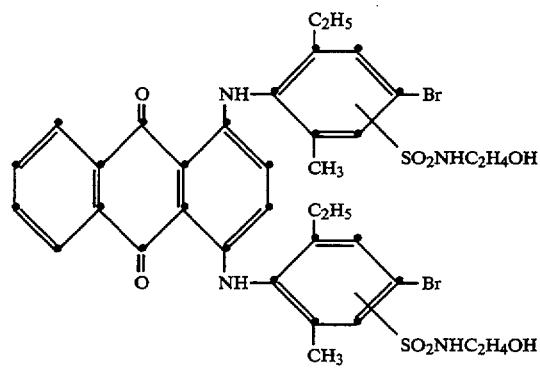

A small amount of the mono sulfonamide derivative was also present. Absorption maxima were observed at 576 nm (ε—16,519) and 619 nm (ε—17,222) in the visible absorption spectrum in methylene chloride.

Example 6

To a solution of 1,4-bis(2-ethyl-6-methylanilino) anthraquinone (3.0 g, 0.00632 m) and p-toluene sulfonic acid (0.05 g) in N,N-dimethylformamide (10 mL) was added dropwise with stirring trifluoroacetic anhydride (10 mL) allowing the temperature to rise. The reaction mixture was heated at about 50° C. for 15 minutes, during which time the color shifted hypsochromically from blue to red indicating that acylation had occurred. The reaction mixture was drowned into water (250 mL) and the red product was collected by filtration, washed with water and dried in air (yield—3.50 g, 97.2% of the theoretical yield). Mass spectrometry supported the following mono acylated product:

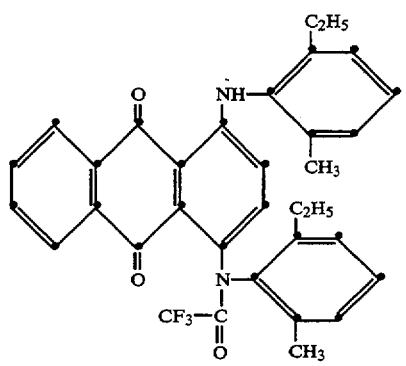

An absorption maximum was observed at 522 nm (ε—7,079) in the visible absorption spectrum in methylene chloride.

Example 7

A portion (1.5 g, 0.00263 m) of the product of Example 6 was added portionwise to chlorosulfonic acid (15 mL) at room temperature. After being stirred at room temperature for about 30 minutes, the reaction mixture drowned onto an ice/water mixture with stirring. The yellow-red product was collected by filtration, washed with water, pressed to remove most of the water and then added to ethanolamine (20 mL). After being heated at about 90°–95° C. with stirring for 1.0 hour to form the sulfonamide product, removal of the trifluoroacetyl groups by hydrolysis was accomplished by treating the reaction mixture with 2-ethoxyethanol (15.0 mL), water (5.0 mL) and 0.5 mL of 50% NaOH solution and heating and stirring for about 0.5 hour. The color of the reaction mixture charged from red to blue during this time. The final reaction mixture was drowned into water (200 mL) and the blue product collected by filtration, washed with water and dried in air (yield—1.27 g). Mass spectrometry indicated the desired mono-sulfonamide product was obtained having the following structure:

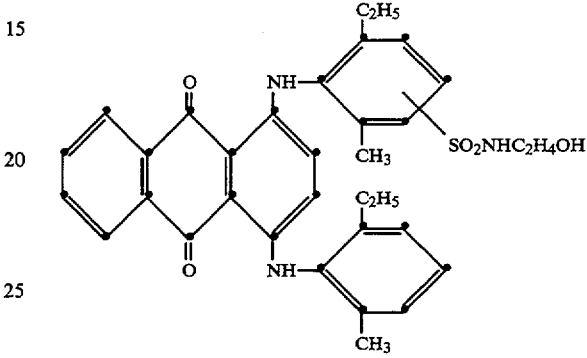

Absorption maxima were observed at 582 nm (ε—14,706) and 627 nm (ε—15,902) in the visible absorption spectrum in methylene chloride.

Example 8

The anthraquinone di-sulfonyl chloride produced by chlorosulfonation of 1,4-bis(2-ethyl-6-methylanilino) anthraquinone (0.01 m) was added portionwise to a solution of 2-methylaminoethanol (1.80 g, 0.024 m) in methylene chloride (70.0 mL) containing triethyl amine (2.53 g, 0.025 m) allowing the temperature to rise spontaneously to about 27° C. Thin-layer chromatography showed complete reaction after the reaction mixture had been stirred at room temperature for about 30 minutes. The organic reaction mixture was extracted twice with 250 mL water and the aqueous layer removed. The methylene chloride was removed under reduced pressure to give an oily layer which solidified when triturated with n-hexane. After collecting by filtration, washing with n-hexane and drying in air, the dark blue product weighed 6.32 g (84.5% of the theoretical yield). Mass spectrometry supported the following structure:

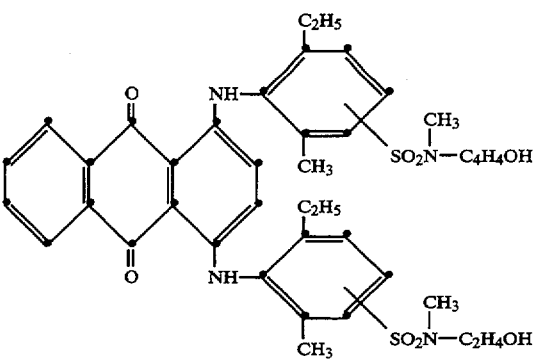

Absorption maxima were observed at 578 nm (ε—14,511) and 621 nm (ε—15,334) in the visible absorption spectrum in methylene chloride.

Example 9

The anthraquinone di-sulfonyl chloride produced by chlorosulfonation of 1,4-bis(2-ethyl-6-methyl anilino) anthraquinone (0.0025 m) was added to a stirred solution of 2-ethylaminoethanol (0.54 g, 0.006 m) and triethyl amine (0.64 g, 0.0065 m) in methylene chloride (15.0 mL) at room temperature with stirring. A slight exotherm was observed and the reaction mixture was stirred for about 30 minutes. Thin-layer chromatography (1:1 tetrahydrofuran:cyclohexane) showed complete reaction. The blue methylene chloride solution was washed five times with 200 mL portions of water and then with saturated sodium chloride solution. The methylene chloride was removed by evaporation and the residue triturated in n-hexane to give a solid which was collected by filtration, washed with n-hexane and air dried (yield—1.83 g, 94.39% of the theoretical yield). Mass spectrometry supported the following structure:

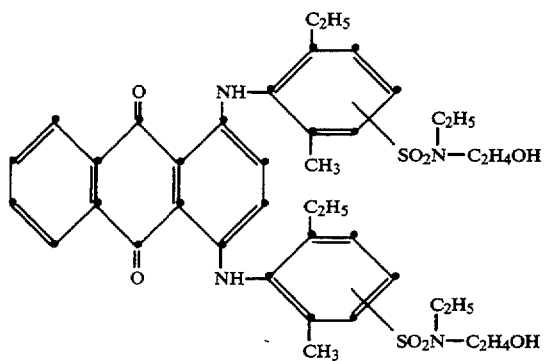

Absorption maxima at 579 nm (ε—15,054) and 622 nm (ε—15,986) were observed in the visible spectrum in methylene chloride.

Example 10

To chlorosulfonic acid (12.5 mL) was added portionwise 1,5-bis-(2-anisidino) anthraquinone (2.25 g, 0.005 m) at less than 35° C. with stirring. The reaction mixture was stirred at room temperature for 3.0 hours and then added dropwise to acetone (250 mL) with cooling. The solid di-sulfonyl chloride precipitated and was collected by filtration, washed with acetone and dried in air (yield—2.85 g). All of the di-sulfonyl chloride was added to 2-aminoethanol (35.0 g, 0.57 m) and the reaction mixture was stirred at about 90°-95° C. for 1.0 hr, allowed to cool to room temperature and then drowned in acetone (200 mL). The dark red product was collected by filtration, washed with acetone and dried in air [yield—2.15 g, 61.7% of the theoretical yield based on the starting 1,4-bis(2-anisidino)anthraquinone. The proposal structure, which is supported by mass spectrometry is as follows.

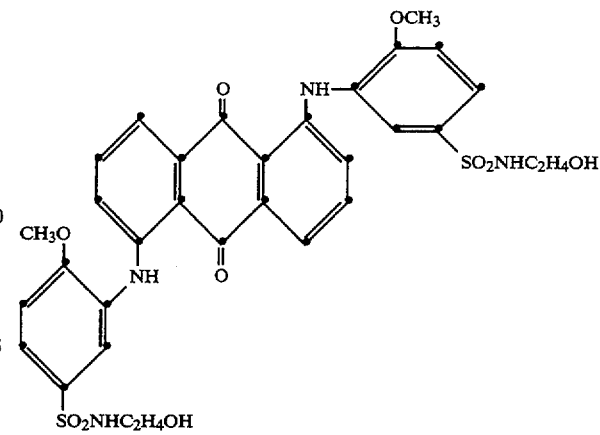

The UV-visible absorption spectrum in methylene chloride had absorption maxima at 333 nm (ε—20,132) and 543 nm (ε—15,508).

Example 11

The anthraquinone di-sulfonyl chloride prepared from 0.005 m of 1,5-bis(2-anisidino) anthraquinone, as described in Example 10, was added to 2-methylaminoethanol (40.0 mL) and the reaction mixture stirred at 90°-95° C. for 1.0 hour, during which time the di-sulfonamide product crystallized. It was collected by filtration, washed with acetone and dried in air (yield—2.17 g, 59.97% of the theoretical yield based on the starting 1,4-bis(2-anisidino) anthraquinone. Mass spectrometry supports the following structure:

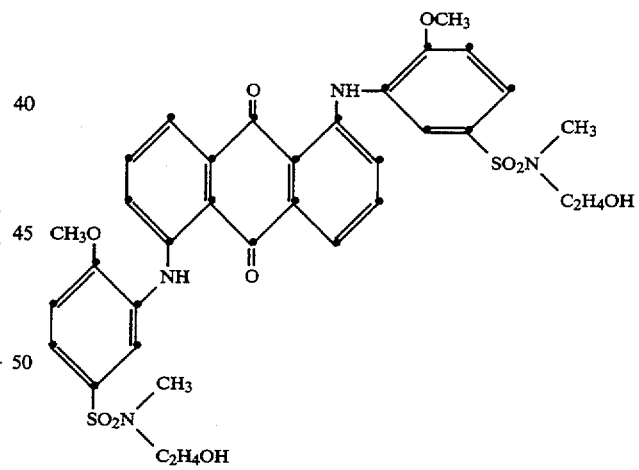

An absorption maximum at 530 nm (ε—15,150) was observed in the visible absorption spectrum in N,N-dimethylformamide.

Example 12

The anthraquinone di-sulfonyl chloride prepared from 0.01 m of 1,5-bis(2-anisidino) anthraquinone, as described in Example 10, was added to a solution of 2-(4-aminophenyl)ethanol (4.37 g, 0.04 m) in pyridine (35 mL). The reaction mixture was heated with stirring to about 55° C. and then allowed to stand at room temperature overnight. The reaction mixture was drowned into water (200 mL) containing NaCl (10.0 g) with good stirring. Acetic acid (25.0 mL) was added and the mixture was heated to about 75° C. and allowed to cool. The red precipitate was collected by filtration washed with water and dried in air (yield—7.14 g). Mass spectrometry supported the following proposed structure:

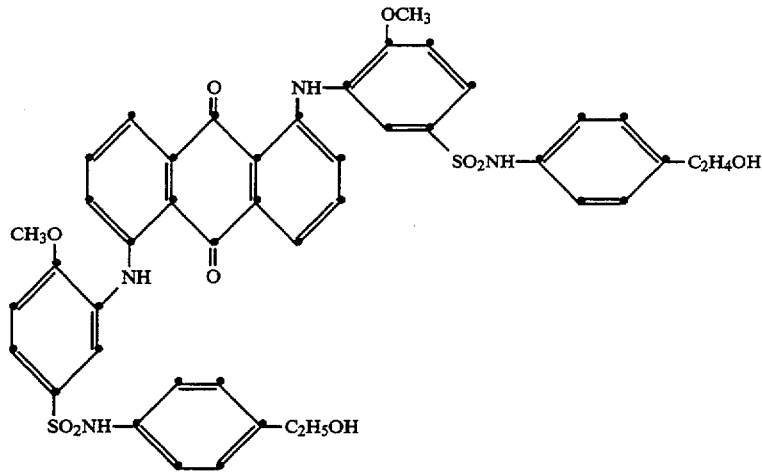

An absorption maximum at 533 nm (ε—14,062) was observed in the visible absorption spectrum in N,N-dimethylformamide.

Example 13

A mixture of 6-bromo-1-cyano-3-methyl-3H-dibenz (f,ij) isoquinoline-2,7-dione (1.82 g, 0.005 m), 4-amino-3,5-dimethylphenol (2.74 g, 0.02 m), potassium carbonate (0.35 g), cupric acetate (0.30 g) and N,N-dimethylformamide (DMF) (10.0 mL) was heated at 80°–90° C. for 1.0 hour, cooled to about 50° C. and then diluted by addition of 5.0 mL additional DMF. The product was then collected by filtration, washed with DMF, washed with methanol and dried in air (yield—2.10 g, 48.6% of the theoretical yield). Mass spectrometry supported the following structure:

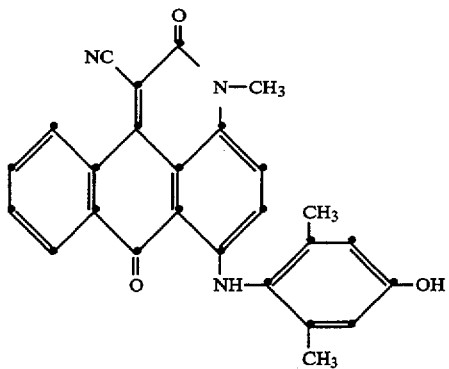

Absorption maxima were observed at 549 nm (ε—9,964) and 585 nm (ε—12,860) in the visible absorption spectrum in methylene chloride.

Example 14

A mixture of 6-bromo-1-cyano-3-methyl-3H-dibenz [f,ij] isoquinoline-2,7-dione (3.65 g, 0.01 m), ethyl 3-aminobenzoate (6.60 g, 0.04 m), potassium carbonate (1.00 g), cupric acetate (1.20 g) and N,N-dimethylformamide (10.0 mL) was heated to about 80° C. The reaction mixture thickened and was then diluted by addition of 20.0 mL of DMF. Heated gradually to about 130° C. and added 10.0 mL additional DMF to facilitate stirring. The reaction mixture was heated at reflux for 2.0 hours and then poured into a beaker while hot using DMF to rinse solid out of the reaction flask. The mixture was then filtered and the solid washed with DMF, washed with ethanol and dried in air (yield—3.0 g, 66.8% of the theoretical yield). Mass spectrometry supports the following structure:

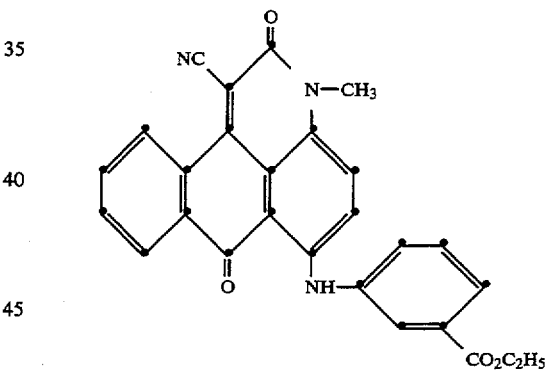

Absorption maxima were observed at 359 nm (ε—12,319) and 585 nm (ε—15,313) in the UV-visible absorption spectrum in methylene chloride.

Example 15

A mixture of 6-bromo-1-cyano-3-methyl-3H-dibenz [f,ij] isoquinoline-2,7-dione (3.65 g, 0.01 m), dimethyl 5-aminoisophthalate (8.4 g, 0.04 m), potassium carbonate (1.0 g), cupric acetate (1.2 g) and N,N-dimethylformamide (DMF) (20.0 mL) was heated to about 120° C. with stirring. The reaction mixture became very thick and additional DMF (70.0 mL) was added to facilitate stirring. After being heated at 140°–145° C. for 15 minutes the reaction mixture was poured into a beaker using DMF to rinse the flask. The product was collected by filtration, washed with DMF, washed with 1:1 DMF:methanol and finally washed with methanol and dried in air (yield—3.02 g, 61.1% of the theoretical yield). Mass spectrometry supports the following proposed structure:

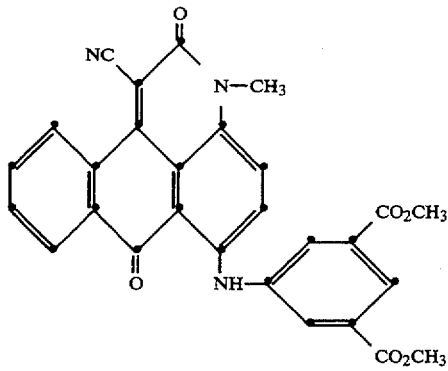

UV-visible spectrum showed absorption maximum at 353 nm and 584 nm in N,N-dimethylformamide.

Example 16

To chlorosulfonic acid (50.0 mL) was added portionwise 6-anilino-1-cyano-3-methyl-3H-dibenz[f,ij]isoquinoline-2,7-dione (7.54 g) with good stirring allowing the temperature to rise. The reaction mixture was then drowned into ice/saturated NaCl solution. The solid sulfonyl chloride compound was collected by filtration, washed with saturated NaCl solution and then added (wet) with good stirring to diethanolamine (50.0 mL). The reaction mixture was then heated at 50° C. for 0.5 hour and then drowned into water with stirring. The solid product was collected by filtration, washed with water and dried in air (yield—9.0 g). Mass spectrometry supported the following proposed structure:

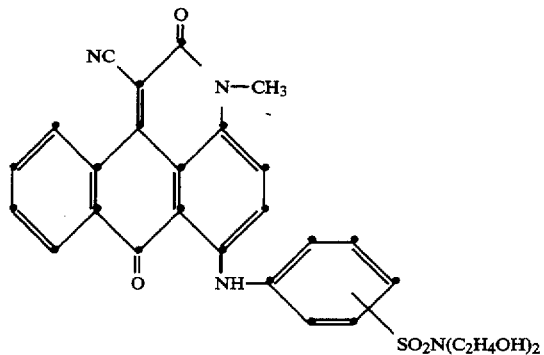

Example 17

A mixture of 6-bromo-1-cyano-3-methyl-3H-dibenz[f,ij]isoquinoline-2,7-dione (36.5 g), methyl 4-aminobenzoate (75.0 g), potassium carbonate (10.0 g), cupric acetate (12.0 g) and N,N-dimethylformamide (DMF) (120 mL) was heated at about 110° C. for 3.0 hours. Additional DMF (140 mL) was added and the mixture allowed to cool to about 30° C. The product was collected by filtration, washed with DMF, washed with water and finally washed with isopropanol and then dried in air (yield 34.0 g). Purification was accomplished by recrystallization from DMF (620 mL) by heating the mixture to reflux and then allowing to cool to 100° C. The product was collected by filtration, washed with DMF, washed with isopropanol and then dried in air (yield—18.8 g). The proposed structure is as follows:

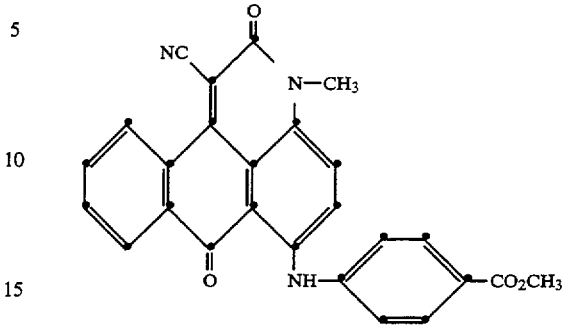

Example 18

A mixture of 6-bromo-1-cyano-3-methyl-3H-benz[f,ij]isoquinoline-2,7-dione (3.65 g, 0.01 m), 4-amino-N-(2-hydroxyethyl)phthalimide (8.24 g, 0.04 m), potassium carbonate (1.0 g), cupric acetate (1.0 g) and N,N-dimethylformamide (DMF) (20 mL) was heated with stirring to 135° C., held at 135°-140° C. for 1.0 hour, and then the hot reaction mixture was drowned gradually into 150 mL of acetone. The solid was collected by filtration, washed with acetone, washed with DMF, reslurried in 50:50 acetone:water, refiltered, washed with acetone and dried in air (yield—2.85 g, 58.2% of the theoretical yield). Mass spectrometry supported the following structure:

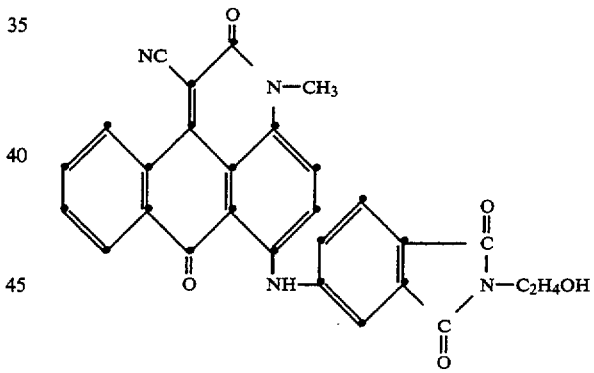

Absorption maxima were observed at 367 nm ($\epsilon$—13,542) and 570 nm ($\epsilon$—14,330) in the UV-visible absorption spectra in 70:30 methylene chloride:hexafluoroisopropanol.

Example 19

A mixture of 6-bromo-1-cyano-3-methyl-3H-dibenz[f,ij]isoquinoline-2,7-dione (1.0 g, 0.003 m), ethyl 4-[3-(aminobenzamido)] benzoate (3.41 g, 0.012 m), potassium carbonate (0.30 g), cupric acetate (0.36 g) and N,N-dimethylformamide (10 mL) was heated and stirred at 120°-125° C. for 6.0 hours. The reaction mixture was allowed to cool and then drowned into dilute aqueous acetic acid with stirring. The solid product was collected by filtration, washed with water, reslurried in methanol (200 mL), refiltered, washed with methanol and dried in air (yield 1.63 g). Purification was accomplished by column chromatography using FLORISIL by dissolving the sample in methylene chloride, placing on a column and then eluting with methylene chloride and then 50:50 methylene chloride:tetrahydrofuran. Evaporation of the solvent yielded the product (0.59 g). Mass spectrometry supported the following structure:

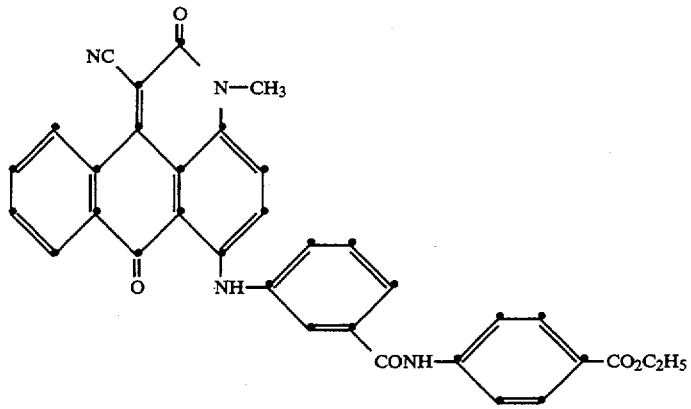

An absorption maximum was observed at 584 nm in the visible absorption spectrum in methylene chloride.

Example 20

A mixture of 6-bromo-1-cyano-3-methyl-3H-dibenz[-f,ij] isoquinoline-2,7-dione (1.0 g, 0.003 m), ethyl α-(3-aminobenzamido) acetate (2.66 g, 0.012 m), potassium carbonate (0.30 g), cupric acetate (0.36 g) and N,N-dimethylformamide (10 mL) was reacted and the crude product isolated and purified by column chromatography to yield 0.24 g of purified product, exactly as described in Example 19. Mass spectrometry supported the following structure:

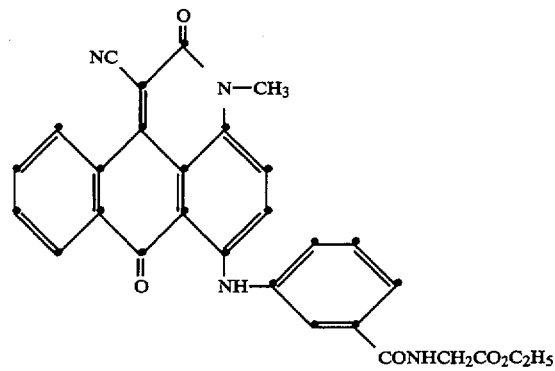

An absorption maximum at 585 nm (ε—16,431) was observed in the visible absorption spectrum in methylene chloride.

Example 21

The anthraquinone di-sulfonyl chloride prepared from 0.005 m of 1,5-bis(2-anisidino) anthraquinone (as prepared in Example 10) was added portionwise at room temperature to a solution of 2-ethylaminoethanol (1.07 g, 0.012 m) and triethylamine (1.27 g, 0.013 m) dissolved in methylene chloride (50.0 mL). After being stirred at room temperature for 3.0 hours, the reaction mixture was filtered and the dark red solid washed with methylene chloride, washed with isopropanol and then dried in air (yield—2.24 g, 59.6% of the theoretical yield). Mass spectrometry supported the following desired structure:

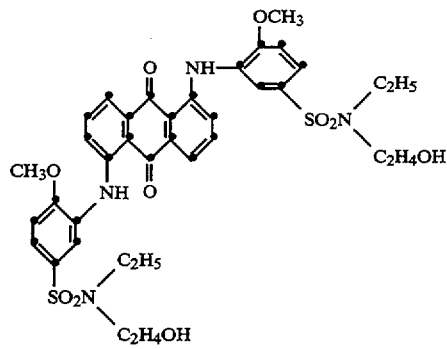

An absorption maximum was observed at 529 nm (ε—15,040) in the visible absorption spectrum in methylene chloride.

Examples 22–322 in Tables I–X illustrate further the scope of the invention as regards useful structures of the toner components.

Examples 323–343 illustrate the preparation of modified poly(ethylene terephthalate) polyester polymers which contain representative amounts of suitable blue and red components copolymerized therein. Color measurement on each polymer was made using a HUNTER LAB ULTRASCAN SPECTROCOLORIMETER (Hunter Associates Laboratory, Inc.) and the Hunter Rd, a, b values determined. The chromaticity dimensions (a and b) give designation of color as follows:

a measures redness when plus and greenness when minus.

b measures yellowness when plus and blueness when minus.

Example 323 (Preparation of Polyester Polymer)

The following materials were placed in a 500 mL, single-neck, round-bottom flask:

| | |
|---|---|
| 97 g | (0.5 moles) Dimethyl terephthalate |
| 42.8 g | (0.69 moles) Ethylene glycol |
| 22.3 g | (0.16 moles) 1,4-Cyclohexanedimethanol |
| 0.00609 g | Ti from a n-butanol solution of acetyl-triisopropyl titanate |
| 0.0050 g | Mn from an ethylene glycol solution of manganese acetate |
| 0.0003261 g | (3.0 ppm) Blue Compound of Example 1 (from an ethylene glycol solution) |

| | |
|---|---|
| 0.000168 g | (1.68 ppm) Red Compound of Example 10 (from an ethylene glycol solution) |

The flask was equipped with a nitrogen inlet, stirrer, vacuum outlet, and condensing flask. The flask and contents were heated at 200° C. in a Belmont metal bath for 80 minutes with a nitrogen sweep and with stirring (stirrer speed was ramped to 25 rpm over first 15 minutes, was ramped from 25 to 200 rpm over 5 minutes, and was held at 200 rpm until final polycondensation stage). The temperature of the bath was increased to 225° C. over a 5 minute period. The flasks and contents were heated at 225° C. for 60 minutes. Then 1.05 mL of an ethylene glycol/n-butanol solution of a mixed phosphorus ester composition (Merpol A) which contained 0.0087 g phosphorus was added. The temperature of the bath was increased to 282° C. over a 20 minute time period. The vacuum was applied over a 5 minute period until the pressure was reduced to 400 mm Hg. The pressure was reduced over a 5 minute time from 400 mm Hg to 100 mm Hg. The pressure was further reduced over a 5 minute time from 100 mm Hg to 10 mm Hg. The pressure was reduced over a 5 minute time from 10 mm Hg to 0.2 mm Hg. The flask and contents were heated at 282° C. under a pressure of 0.2 mmHg for 45 additional minutes with the stirrer speed ranging from 200 rpm at the start of the time period to 25 rpm at the finish. The flask was removed from the metal bath and the polymer was allowed to cool in nitrogen atmosphere. The resulting polymer had an inherent viscosity of 0.76 as measured in a 60/40 ratio by weight of phenol/tetrachloroethane at a concentration of 0.5 g per 100 mL. The polymer was cooled in liquid nitrogen (~ −195° C.) and then broken into pieces, which were ground using a Wiley mill to pass through a 3 mm screen. Approximately 8.0 grams of the granules were molded into a chip approx. 1.5 inches in diameter and 125 mils thick in a Wabash hydraulic press (Wabash Metal Products, Wabash, Ind.) at ~245° C. at 20.000 lbs force for 1.0 minute. The color values were determined as described above on the chip and are reported in Table 11.

Comparative Example 1

Example 323 was repeated except that the blue and red toner components were omitted thus providing a "control" sample for comparison. The color values are reported in Table 11 and indicate that the sample is very yellow.

Examples 324–343

The procedure of Example 323 was repeated exactly except the blue and red toner components were varied as shown in Table 11. The color values were determined as described above and reported in Table 11. The effectiveness of the toner system in eliminating the yellow color of the polymer is shown by observing that many of the systems show a "b" value near zero and all show a "b" value less than that of the polymer of Comparative Example 1 without any toner present.

The following examples (Examples 344–346) show the preparation of poly(ethylene terephthalate) containing various amounts of blue and red toner components. All color measurements were made on a Hunter Lab color measurement device (Hunter Associates Laboratory) and the CIELAB-L*, a* and b* value measured. Again, a* measures redness when plus and greenness when minus; and b* measures yellowness when plus and blueness when minus.

Example 344 Poly(ethylene terephthalate) Preparation

The following materials were place in a 500 mL, three-necked, round-bottom flask:

| | |
|---|---|
| 97 g | (0.5 moles) Dimethyl terephthalate |
| 62 g | (1.0 moles) Ethylene glycol |
| 0.00192 g | Ti from a n-butanol solution of acetyl-triisopropyl titanate |
| 0.0053 g | Mn from an ethylene glycol solution of manganese acetate |
| 0.0345 g | Antimony trioxide |
| 3.3 ppm | Blue Compound of Example 1 (from an ethylene glycol solution) |
| 1.86 ppm | Red Compound of Example 10 (from an ethylene glycol solution) |

The flask was equipped with a nitrogen inlet, stirrer, vacuum outlet, and condensing flask. The flask and contents were heated at 200° C. in a Belmont metal bath for 60 minutes with a nitrogen sweep and with stirring (stirrer speed was ramped to 165 rpm during first 15 minutes and then the stirrer speed was held at 165 rpm throughout the remainder of the run). The temperature of the bath was increased to 210° C. over a 10 minute time period. The flask and contents were heated at 210° C. for 65 minutes. The 1.57 mL of an ethylene glycol/n-butanol solution of a mixed phosphorus ester composition (Merpol A) which contained 0.012 g phosphorus was added. The temperature of the bath was increased to 230° C. over a 10 minute time period. Then vacuum was applied over a 5 minute period until the pressure had been reduced to 200 mm Hg. The flask and contents were heated at 230° C. under a pressure of 200 mm Hg for 25 minutes. The metal bath temperature was increased to 270° C. over a 15 minute time period. The pressure was reduced to 100 mm Hg over a 10 minute period. The flask and contents were heated at 270° C. under a pressure of 100 mmHg for 30 minutes. The temperature of the bath was increased to 285° C. and the pressure was reduced to 6 mm Hg over a 10 minute time period. The flask and contents were heated at 285° C. under a pressure of 6 mm Hg for 25 minutes. The pressure was reduced to 0.3 mm Hg over a 3 minute time period and the polycondensation was continued for 37 minutes. The flask was removed from the metal bath and was allowed to cool in a nitrogen atmosphere while the polymer crystallized. The resulting polymer had an inherent viscosity of 0.65 as measured in a 60/40 ratio by weight of phenol tetrachloroethane at a concentration of 0.5 g per 100 mL. No loss of colorant by vaporization was observed in the distillate collected during polycondensation. The polymer was ground in a Wiley mill, passed through a 3 mm screen, and the color determined on the granules as indicated above. The properties are reported in Table 12.

Example 345

A sample of poly(ethylene terephthalate) was prepared exactly as described in Example 344 except that 4.0 ppm of the blue compound of Example 8 and 2.0 ppm of the red compound of Example 11 were used as the toner system. The properties are reported in Table 12.

Example 346

A sample of poly(ethylene terephthalate) was prepared exactly as described in Example 344 except that 4.5 ppm of the blue compound of Example 9 and 2.0 ppm of the red compound of Example 168 of Table 5 were used as the toner system. The properties are reported in Table 12.

TABLE 1
BLUE ANTHRAQUINONE COMPOUNDS OF STRUCTURE I

| Ex. No. | R | $R_1$ | $R_2$ | $R_3$ | $R_4$ | $R_5$ | X | m | n |
|---|---|---|---|---|---|---|---|---|---|
| 22 | H | $C_2H_5$ | $CH_3$ | H | H | $1,3\text{-}C_6H_4$ | $CO_2CH_3$ | 1 | 1 |
| 23 | H | $C_2H_5$ | $C_2H_5$ | $OCH_3$ | $CH_3$ | $1,4\text{-}C_6H_4$ | $CO_2CH_3$ | 1 | 1 |
| 24 | H | $CH_3$ | $CH_3$ | $OCH_2CH_3$ | $CH_2CH_3$ | $CH_2CH_2$ | OH | 1 | 1 |
| 25 | H | $CH_3$ | $CH_3$ | $OCH_2C_6H_5$ | $CH_2CH_2OH$ | $CH_2CH_2$ | OH | 1 | 1 |
| 26 | H | $CH_3$ | $CH_3$ | $CH_3$ | $CH_2CH_2OCOCH_3$ | $CH_2CH_2OCOCH_3$ | $OCOCH_3$ | 1 | 1 |
| 27 | H | $CH_3$ | $CH_3$ | $CH_3$ | H | $1,4\text{-}C_6H_4CH_2CH_2$ | OH | 1 | 1 |
| 28 | H | $CH_3$ | $CH_3$ |  | $1,4\text{-}C_6H_4CH_2$ | OH | — | 1 | 1 |
| 29 | H | $C_2H_5$ | $CH_3$ | H | H | $1,3\text{-}C_6H_4CH_2$ | OH | 1 | 1 |
| 30 | H | $1,3\text{-}C_6H_4CH\!-\!CH_3$ | OH | — | — | — | — | — | — |
| 31 | H | $C_2H_5$ | $C_2H_5$ | H | H | $1,2\text{-}C_6H_4$ | $CO_2H$ | 1 | 1 |
| 32 | H | $C_2H_5$ | $CH_3$ | H | H | $1,2\text{-}C_6H_4$ | $CO_2CH_3$ | 1 | 1 |
| 33 | H | $C_2H_5$ | $C_2H_5$ | H | H | $CH_2C(CH_3)_2CH_2$ | OH | 1 | 1 |
| 34 | H | $C_2H_5$ | $C_2H_5$ | H | H | $CH_2\text{-}1,4\text{-}C_6H_{10}CH_2$ | OH | 1 | 1 |
| 35 | H | $C_2H_5$ | $C_2H_5$ | H | H | $CH_2CH_2$ | OH | 1 | 1 |
| 36 | H | $C_2H_5$ | $C_2H_5$ | H | H | $CH_2$ | $CO_2C_2H_5$ | 1 | 1 |
| 37 | H | $C_2H_5$ | $C_2H_5$ | H | H | $1,3\text{-}C_6H_4$ | $CO_2C_2H_5$ | 1 | 1 |
| 38 | H | $C_2H_5$ | $CH_3$ | H | H | $CH_2CH_2OCH_2CH_2OCH_2CH_2$ | OH | 1 | 1 |
| 39 | H | $CH_3$ | $CH_3$ | $CH_3$ | H | $CH_2\text{-}1,4\text{-}C_6H_4$ | $CO_2CH_3$ | 1 | 1 |

TABLE 1-continued

BLUE ANTHRAQUINONE COMPOUNDS OF STRUCTURE I

| Ex. No. | R | $R_1$ | $R_2$ | $R_3$ | $R_4$ | $R_5$ | X | m | n |
|---|---|---|---|---|---|---|---|---|---|
| 40 | H | $CH_3$ | $CH_3$ | $OCH_2$-⟨C₆H₃⟩-$CO_2H$ | H | — | — | 0 | 0 |
| 41 | H | $CH_3$ | $CH_3$ | $OCH_2CO_2CH_3$ | — | — | — | 0 | 0 |
| 42 | H | $C_2H_5$ | $C_2H_5$ | $CO_2CH_3$ | — | — | — | 0 | 0 |
| 43 | H | $C_2H_5$ | $CH_3$ | COOH | — | — | — | 0 | 0 |
| 44 | 6(7)COOH | $C_2H_5$ | $C_2H_5$ | CN | — | — | — | 0 | 0 |
| 45 | 6(7)$CO_2CH_3$ | $C_2H_5$ | $C_2H_5$ | $OC_6H_5$ | — | — | — | 0 | 0 |
| 46 | H | $C_2H_5$ | $CH_3$ | $SCH_2CH_2OH$ | — | — | — | 0 | 1 |
| 47 | H | $C_2H_5$ | $CH_3$ | $SO_2(CH_2)_4OH$ | — | — | — | 0 | 1 |
| 48 | H | $C_2H_5$ | $C_2H_5$ | H | H | $1,4-C_6H_4$ | $CO_2CH_3$ | 0 | 1 |
| 49 | H | $C_2H_5$ | $C_2H_5$ | H | $CH_3$ | $1,4-C_6H_4$ | $CO_2C_2H_5$ | 0 | 1 |
| 50 | H | $C_2H_5$ | $C_2H_5$ | H | $CH_2CH_2OH$ | $CH_2CH_2$ | OH | 1 | 1 |
| 51 | H | $C_2H_5$ | $C_2H_5$ | H | $C_2H_5$ | $1,3-C_6H_4$ | $CO_2CH_3$ | 1 | 1 |
| 52 | H | $C_2H_5$ | $C_2H_5$ | H | $CH_2CH=CH_2$ | $CH_2CH_2$ | $OCOCH_3$ | 0 | 1 |
| 53 | H | $C_2H_5$ | $C_2H_5$ | H | $CH_2C\equiv CH$ | $CH_2CH_2OCH_2CH_2$ | $OCO_2C_2H_5$ | 1 | 1 |
| 54 | H | $C_2H_5$ | $C_2H_5$ | H | $C_6H_{11}$ | $CH_2CH_2OCH_2CH_2$ | OH | 1 | 1 |
| 55 | H | $C_2H_5$ | $C_2H_5$ | H | $CH_3$ | $CH_2C(CH_3)_2CH_2$ | OH | 1 | 1 |
| 56 | H | $C_2H_5$ | $C_2H_5$ | $CH_3$ | H | $CH_2CH(OH)CH_2$ | OH | 0 | 1 |
| 57 | H | $C_2H_5$ | $C_2H_5$ | $CH_3$ | $CH_2C_6H_5$ | $CH_2CH(OCOCH_3)CH_2$ | $OCOCH_3$ | 1 | 1 |
| 58 | H | $C_2H_5$ | $C_2H_5$ | $CH_3$ | $CH_2CH_2C_6H_5$ | $CH_2-1,4-C_6H_4$ | $CO_2CH_3$ | 1 | 1 |
| 59 | H | $C_2H_5$ | $C_2H_5$ | $CH_3$ | $CH_3$ | $CH_2-1,4-C_6H_{10}CH_2$ | OH | 0 | 1 |
| 60 | H | $C_2H_5$ | $C_2H_5$ | Cl | H | $1,4-C_6H_4-OCH_2CH_2$ | OH | 1 | 1 |
| 61 | H | $C_2H_5$ | $C_2H_5$ | Br | $CH_3$ | $1,4-C_6H_{10}$ | OH | 1 | 1 |
| 62 | H | $C_2H_5$ | $C_2H_5$ | $CH_3$ | H | $CH_2-1,4-C_6H_4-CH_2$ | $OCOC_6H_{11}$ | 0 | 1 |
| 63 | H | $C_2H_5$ | $C_2H_5$ | H | H | $CH_2CH_2SCH_2CH_2$ | $CO_2C_2H_5$ | 1 | 1 |
| 64 | H | $C_2H_5$ | $C_2H_5$ | H | H | $1,4-C_6H_4-SO_2CH_2CH_2$ | OH | 1 | 1 |
| 65 | H | $C_2H_5$ | $C_2H_5$ | H | H | $CH_2CH_2O-1,4-C_6H_4OCH_2CH_2$ | $CO_2CH_3$ | 1 | 1 |
| 66 | H | $CH_3$ | $CH_3$ | H | $C_5H_9$ | $CH_2-1,4-C_6H_4-$ | OH | 1 | 1 |
| 67 | H | $CH(CH_3)_2$ | $CH(CH_3)_2$ | H | H | $(CH_2)_8$ | $CO_2CH_3$ | 1 | 1 |
| 68 | H | $C(CH_3)_3$ | $C(CH_3)_3$ | H | $C_6H_{11}$ | $CH_2$ | $CO_2C_2H_5$ | 1 | 1 |
| 69 | H | $CH_2CH_2CH_3$ | $CH_2CH_2CH_3$ | H | H | $CH_2CH_2$ | $CO_2C_2H_5$ | 1 | 1 |
| 70 | H | $C_4H_{9\text{-}n}$ | $C_4H_{9\text{-}n}$ | H | $C_6H_5$ | $CH_2CH_2$ | $OCO_2C_6H_5$ | 1 | 1 |
| 71 | H | $C_2H_5$ | $CH_3$ | H | $CH_2C_6H_{11}$ | $CH_2CH_2S$-⟨1,4-C₆H₄-CH₃⟩ | COOH | 1 | 1 |
| 72 | H | $C_2H_5$ | $C_2H_5$ | H | H | -⟨C₆H₄-$CO_2CH_3$⟩ | $CO_2CH_3$ | 0 | 1 |
| 73 | H | $C_2H_5$ | $C_2H_5$ | H | H | $CH_2CH_2O$-⟨C₆H₄-CH₃⟩ | $CO_2CH_3$ | 1 | 1 |

TABLE 1-continued

BLUE ANTHRAQUINONE COMPOUNDS OF STRUCTURE I

| Ex. No. | R | $R_1$ | $R_2$ | $R_3$ | $R_4$ | $R_5$ | X | m | n |
|---|---|---|---|---|---|---|---|---|---|
| 74 | H | $C_2H_5$ | $C_2H_5$ | H | H | $CH_2CH_2S$-(aryl) | COOH | 1 | 1 |
| 75 | H | $C_2H_5$ | $C_2H_5$ | H | H | $CH_2CH_2$ | OH | 1 | 1 |
| 76 | H | $C_2H_5$ | $C_2H_5$ | H | $CH_3$ | $CH_2CH_2$ | OH | 0 | 1 |
| 77 | 5(8)$CH_3$ | $C_2H_5$ | $C_2H_5$ | H | $C_2H_5$ | $(CH_2)_4$ | OH | 1 | 1 |
| 78 | 6(7)Cl | $C_2H_5$ | $CH_3$ | H | $C_6H_5$ | $CH_2CH_2CH_2$ | $OCOCH_3$ | 1 | 1 |
| 79 | 6(7)COOH | $CH_3$ | $CH_3$ | $CH_3$ | H | $CH_2CH_2$ | OH | 1 | 1 |
| 80 | 6(7)COOH | $CH_3$ | $CH_3$ | H | — | — | — | 0 | 0 |
| 81 | 6(7)$CO_2CH_3$ | $CH_3$ | $CH_3$ | $CH_3$ | — | — | — | 0 | 0 |
| 82 | 6(7)$CO_2CH_3$ | $C_2H_5$ | $C_2H_5$ | $SO_2CH_3$ | — | — | — | 0 | 0 |
| 83 | 6(7)$CO_2CH_3$ | $C_2H_5$ | $CH_3$ | Br | — | — | — | 0 | 0 |
| 84 | 6(7)$CO_2H$ | $C_2H_5$ | $C_2H_5$ | SCN | — | — | — | 0 | 0 |
| 85 | 6(7)$CO_2C_2H_5$ | $CH_3$ | $CH_3$ | $SCH_3$ | — | — | — | 0 | 0 |
| 86 | 6(7)$CO_2CH_3$ | $CH_3$ | $CH_3$ | OH | — | — | — | 0 | 0 |
| 87 | 6(7)$CO_2CH_3$ | $CH_3$ | $CH_3$ | $OCH_3$ | — | — | — | 0 | 0 |
| 88 | 6(7)$CO_2CH_3$ | $CH_3$ | $CH_3$ | $OCH_2C_6H_5$ | — | — | — | 0 | 0 |
| 89 | 6(7)$CO_2CH_3$ | $CH_3$ | $CH_3$ | $OC_6H_5$ | — | — | — | 0 | 0 |
| 90 | 6(7)$CO_2CH_3$ | $CH_3$ | $CH_3$ | $SC_6H_5$ | — | — | — | 0 | 0 |
| 91 | 6(7)$CO_2CH_3$ | $CH_3$ | $CH_3$ | $SO_2C_6H_4$-4-$CH_3$ | — | — | — | 0 | 0 |
| 92 | 6(7)$CO_2H$ | $CH_3$ | $CH_3$ | $OCH_2CO_2C_2H_5$ | — | — | — | 0 | 0 |

— Indicates no substituent present.

TABLE 2

RED ANTHRAQUINONE COMPOUNDS OF STRUCTURE II

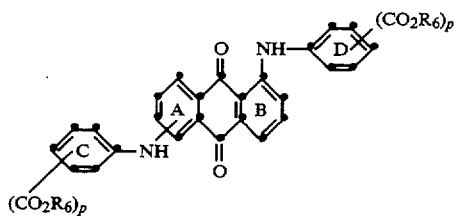

| Ex. No. | Position of —NH— on Ring A | Position of —CO$_2$C$_6$ on Rings C & D | R$_6$ | p |
|---|---|---|---|---|
| 93 | 5 | 2 | H | 1 |
| 94 | 8 | 2 | H | 1 |
| 95 | 5(8) | 2 | H | 1 |
| 96 | 5 | 2 | CH$_3$ | 1 |
| 97 | 5 | 3,5-di- | CH$_3$ | 2 |
| 98 | 5 | 4 | CH$_3$ | 1 |
| 99 | 8 | 3 | CH$_3$ | 1 |
| 100 | 8 | 4 | CH$_2$CH$_3$ | 1 |
| 101 | 5(8) | 3 | CH$_2$CH$_3$ | 1 |
| 102 | 5 | 3,5-di- | CH$_2$CH$_2$OH | 2 |
| 103 | 5 | 2 | CH$_2$CH$_2$OCH$_2$CH$_2$OH | 1 |
| 104 | 5 | 2 | CH$_2$CH$_2$OC$_2$H$_5$ | 1 |
| 105 | 8 | 3 | CH$_2$CH$_2$CN | 1 |
| 106 | 5(8) | 3 | CH$_2$C$_6$H$_5$ | 1 |
| 107 | 5 | 3 | CH$_2$C$_6$H$_{11}$ | 1 |
| 108 | 5 | 3 | CH$_2$CH$_2$OC$_6$H$_5$ | 1 |
| 109 | 5 | 3 | C$_6$H$_5$ | 1 |
| 110 | 5 | 3 | C$_6$H$_4$-4-CH$_3$ | 1 |
| 111 | 5(8) | 4 | CH$_2$CH$_2$CH$_2$OH | 1 |
| 112 | 8 | 2 | CH$_2$CH$_2$OCOCH$_3$ | 1 |
| 113 | 5 | 3 | CH$_2$CH$_2$SCH$_2$CH$_2$OH | 1 |
| 114 | 5 | 3 | CH$_2$CH$_2$SCH$_3$ | 1 |
| 115 | 5 | 3 | CH$_2$CH$_2$SC$_6$H$_5$ | 1 |
| 116 | 5 | 3 | (CH$_2$CH$_2$O)$_3$H | 1 |
| 117 | 5(8) | 4 | CH$_2$C$_6$H$_{10}$CH$_2$OH | 1 |
| 118 | 5 | 2 | C$_6$H$_4$-4-CO$_2$CH$_3$ | 1 |
| 119 | 5 | 2 | CH$_2$CH(OH)CH$_2$OH | 1 |
| 120 | 5 | 2 | CH$_2$CH(OCOCH$_3$)CH$_2$OCOCH$_3$ | 1 |
| 121 | 5 | 2 | C$_5$H$_9$ | 1 |
| 122 | 5 | 2 | C$_4$H$_9$-n | 1 |

TABLE 3

RED ANTHRAQUINONES OF STRUCTURE III

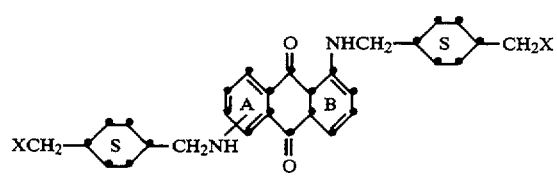

| Ex. No. | Position of —NH— on Ring A | X |
|---|---|---|
| 123 | 5 | OH |
| 124 | 5(8) | OH |
| 125 | 8 | OH |
| 126 | 5 | OCOCH$_3$ |
| 127 | 5 | OCOCH$_2$CH$_3$ |
| 128 | 5 | OCOC$_6$H$_5$ |
| 129 | 5 | OCOC$_6$H$_{11}$ |
| 130 | 8 | OCOCH$_2$Cl |
| 131 | 5(8) | COOH |
| 132 | 5 | CO$_2$CH$_3$ |
| 133 | 5 | CO$_2$CH$_2$CH$_2$OH |
| 134 | 8 | CO$_2$CH$_2$CH$_2$OC$_2$H$_5$ |
| 135 | 5 | CO$_2$(CH$_2$CH$_2$O)$_2$H |
| 136 | 5 | CO$_2$CH$_2$C$_6$H$_5$ |
| 137 | 5 | CO$_2$CH$_2$CH$_2$OC$_6$H$_5$ |
| 138 | 5 | CO$_2$CH$_2$CH(OH)CH$_2$OH |
| 139 | 5 | OCO$_2$C$_2$H$_5$ |
| 140 | 5(8) | OCONHCH$_3$ |
| 141 | 5 | OCONHC$_6$H$_5$ |
| 142 | 5 | COOH |
| 143 | 5 | OCOC$_4$H$_9$-n |
| 144 | 5 | OCOCH$_2$CN |
| 145 | 5 | OCOCH$_2$OH |
| 146 | 5 | CO$_2$CH$_2$—C$_6$H$_{10}$—CH$_2$OH |
| 147 | 8 | CO$_2$CH$_2$CH$_2$CN |
| 148 | 5(8) | COCH$_2$CH$_2$Cl |
| 149 | 5 | OCON(CH$_3$)$_2$ |
| 150 | 5 | CO$_2$(CH$_2$)$_4$OH |
| 151 | 5 | CO$_2$CH$_2$C$_6$H$_{11}$ |
| 152 | 8 | OCO$_2$C$_6$H$_5$ |

TABLE 4

RED ANTHRAQUINONES OF STRUCTURE IV

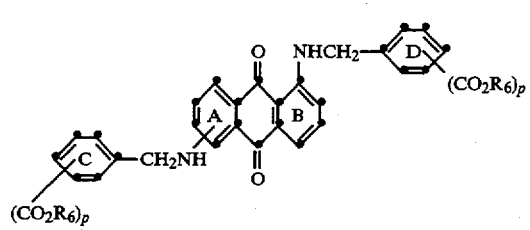

| Ex. No. | Position of —NH— on Ring A | Position of —CO$_2$R$_6$ on Rings C & D | R$_6$ | p |
|---|---|---|---|---|
| 153 | 5 | 4 | H | 1 |
| 154 | 5 | 3,5-di | CH$_3$ | 2 |
| 155 | 8 | 4 | CH$_3$ | 1 |
| 156 | 5 | 3 | H | 1 |
| 157 | 5 | 3 | CH$_3$ | 1 |
| 158 | 5(8) | 4 | CH$_3$ | 1 |
| 159 | 5 | 2 | H | 1 |
| 160 | 5 | 2 | CH$_3$ | 1 |
| 161 | 5 | 4 | CH$_2$CH$_3$ | 1 |
| 162 | 5 | 4 | CH$_2$CH$_2$OH | 1 |
| 163 | 5(8) | 4 | (CH$_2$CH$_2$O)$_3$H | 1 |
| 164 | 5 | 3 | C$_6$H$_5$ | 1 |
| 165 | 5 | 4 | C$_6$H$_{11}$ | 1 |
| 166 | 5 | 4 | (CH$_2$)$_4$OH | 1 |
| 167 | 5 | 4 | CH$_2$—C$_6$H$_{10}$—CH$_2$—OH | 1 |

TABLE 5

RED ANTHRAQUINONES OF STRUCTURE V

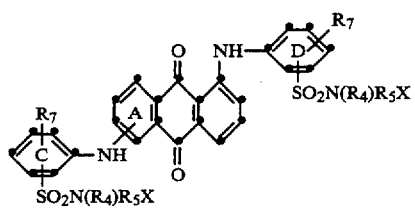

| Ex. No. | Position of —NH— on Ring A | Position of —SO$_2$— on Rings C & D | R$_4$ | R$_5$ | R$_7$ | X |
|---|---|---|---|---|---|---|
| 168 | 5 | 5 | H | —CH$_2$CH$_2$CH$_2$— | 2-OCH$_3$ | OH |
| 169 | 5 | 5 | CH$_3$ | —CH$_2$CH$_2$— | 2-SCH$_3$ | OH |
| 170 | 8 | 5 | H | —CH$_2$CH$_2$— | 2-Cl | OH |
| 171 | 5(8) | 5 | CH$_2$CH$_3$ | —(CH$_2$)$_3$— | 2-Br | OCOCH$_3$ |
| 172 | 5 | 5 | C$_6$H$_5$ | —CH$_2$CH$_2$— | 2-OC$_4$H$_9$-n | OH |
| 173 | 5 | 5 | C$_6$H$_5$ | —CH$_2$C$_6$H$_4$— | 2-OCH$_3$ | CO$_2$CH$_3$ |
| 174 | 5 | 5 | C$_6$H$_{11}$ | —(CH$_2$)$_4$— | 2-OC$_2$H$_5$ | OH |
| 175 | 5 | 5 | CH$_2$CH$_2$OH | —CH$_2$CH$_2$— | 2-OCH$_3$ | OH |
| 176 | 5 | 5 | CH$_2$CH=CH$_2$ | —CH$_2$CH$_2$— | 2-SC$_4$H$_9$-n | OH |
| 177 | 8 | 5 | CH$_2$C≡CH | 1,4-C$_6$H$_4$— | 2-OCH$_3$ | CO$_2$CH$_3$ |
| 178 | 5 | 3(5) | H | —CH$_2$CH$_2$— | 2,6-di-CH$_3$ | OH |
| 179 | 5 | 2(3) | H | 1,4-C$_6$H$_4$— | 4-CH$_3$ | OH |
| 180 | 5 | 2(3) | H | 1,3-C$_6$H$_4$— | 4-OCH$_3$ | OH |
| 181 | 8 | 2(3) | H | 1,2-C$_6$H$_4$— | 4-NHCOCH$_3$ | OH |
| 182 | 5 | 5 | CH$_3$ | —CH$_2$— | 2-OCH$_3$ | CO$_2$C$_2$H$_5$ |
| 183 | 5 | 5 | H | —CH$_2$CH$_2$OCH$_2$CH$_2$— | 2-OCH$_3$ | OH |
| 184 | 5 | 5 | H | —CH$_2$CH$_2$OC$_6$H$_4$-4- | 2-OCH$_3$ | CO$_2$CH$_3$ |
| 185 | 5 | 5 | H | —CH$_2$C$_6$H$_{10}$-4-CH$_2$— | 2-OCH$_3$ | OH |
| 186 | 5 | 5 | H | —CH$_2$C$_6$H$_4$-4-CH$_2$— | 2-OCH$_3$ | OH |
| 187 | 5 | 5 | H | —CH$_2$CH$_2$SCH$_2$CH$_2$— | 2-OCH$_3$ | OH |
| 188 | 5 | 5 | H | —CH$_2$CH$_2$SO$_2$-4-C$_6$H$_4$— | 2-OCH$_3$ | CO$_2$CH$_3$ |
| 189 | 5 | 5 | C$_6$H$_4$-4-CO$_2$H | —CH$_2$CH$_2$— | 2-OCH$_3$ | CO$_2$H |
| 190 | 5 | 5 | C$_4$H$_9$-n | —CH$_2$C(CH$_3$)$_2$CH$_2$— | SC$_4$H$_9$-n | OH |
| 191 | 5 | 5 | H | ⟨phenyl⟩—OCH$_2$—CH$_2$— | 2-OCH$_3$ | CO$_2$CH$_3$ |
| 192 | 5 | 3(5) | C$_3$H$_5$ | ⟨phenyl⟩—SCH$_2$CH$_2$— | 2,4,6-Tri-CH$_3$ | OH |
| 193 | 5 | 5 | C$_6$H$_4$-4-CH$_3$ | —(CH$_2$)$_8$— | 2-I | NH$_2$ |
| 194 | 5 | 5 | H | ⟨phenyl with CO$_2$CH$_3$⟩ | 2-OC$_2$H$_5$ | CO$_2$CH$_3$ |
| 195 | 5 | 5 | H | ⟨phenyl with CH$_3$⟩ | 2-OC$_6$H$_{13}$-n | CO$_2$CH$_3$ |
| 196 | 5 | 5 | H | —CH$_2$CH$_2$ | 2-OCH(CH$_3$)$_2$ | NHCH$_3$ |
| 197 | 5 | 2(3) | H | —CH$_2$CH(OH)CH$_2$— | 4-C(CH$_3$)$_3$ | OH |
| 198 | 5 | 2(3) | H | —CH$_2$C(CH$_3$)CH$_2$— | 4-C$_6$H$_{13}$-n | OH |

TABLE 5-continued

RED ANTHRAQUINONES OF STRUCTURE V

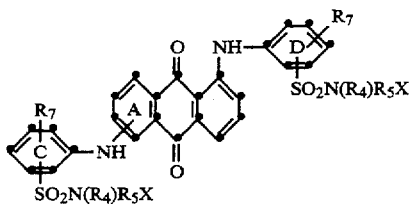

| Ex. No. | Position of —NH— on Ring A | Position of —SO$_2$— on Rings C & D | R$_4$ | R$_5$ | R$_7$ | X |
|---|---|---|---|---|---|---|
| 199 | 5 | 5 | CH$_2$CH$_2$OCOCH$_3$ | —CH$_2$CH$_2$— | 2-OCH$_3$ | OCOCH$_3$ |
| 200 | 5 | 5 | CH$_2$CH$_2$OCO$_2$CH$_3$ | —CH$_2$CH$_2$— | 2-OCH$_3$ | OCO$_2$CH$_3$ |
| 201 | 5 | 5 | CH$_3$ | 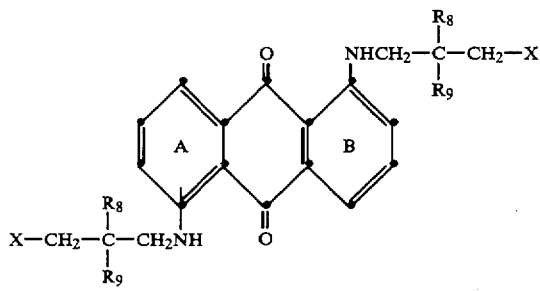 | 2-OCH$_2$CH$_3$ | CO$_2$C$_2$H$_5$ |

TABLE 6

RED ANTHRAQUINONES OF STRUCTURE VI

| Ex. No. | Position of —NH— on Ring A | R$_8$ | R$_9$ | X |
|---|---|---|---|---|
| 202 | 1,5 | CH$_3$ | CH$_3$ | OH |
| 203 | 1,8 | CH$_3$ | CH$_3$ | OH |
| 204 | 1,5(8) | CH$_3$ | CH$_3$ | OCOCH$_3$ |
| 205 | 1,5 | CH$_3$ | CH$_2$CH(CH$_3$)$_2$ | OH |
| 206 | 1,5 | CH$_3$ | C$_6$H$_{11}$ | OCOC$_2$H$_5$ |
| 207 | 1,5 | C$_6$H$_5$ | C$_6$H$_5$ | OCONHC$_6$H$_5$ |
| 208 | 1,8 | C$_6$H$_5$ | CH$_2$C$_6$H$_5$ | OCO$_2$C$_2$H$_5$ |
| 209 | 1,8 | C$_2$H$_5$ | CH$_3$ | NH$_2$ |
| 210 | 1,5 | CH$_3$ | C$_6$H$_5$ | NHCH$_3$ |
| 211 | 1,5 | CH$_3$ | C$_5$H$_9$ | NHC$_2$H$_5$ |
| 212 | 1,5 | CH$_3$ | CH$_3$ | CO$_2$H |
| 213 | 1,5 | CH$_3$ | CH$_3$ | CO$_2$C$_2$H$_5$ |
| 214 | 1,5 | CH$_2$CH$_3$ | CH$_2$CH$_3$ | CO$_2$CH$_3$ |
| 215 | 1,5 | CH$_3$ | CH$_3$ | CO$_2$CH$_2$CH$_2$OH |
| 216 | 1,5 | CH$_3$ | CH$_3$ | CO$_2$CH$_2$C$_6$H$_5$ |
| 217 | 1,5 | CH$_3$ | C$_6$H$_4$-4-CH$_3$ | CO$_2$CH$_2$CH$_2$Cl |
| 218 | 1,5 | CH$_3$ | C$_6$H$_4$-3-CH$_3$ | CO$_2$C$_6$H$_5$ |
| 219 | 1,5 | CH$_3$ | CH$_3$ | OCONHCH$_3$ |
| 220 | 1,5 | CH$_3$ | CH$_3$ | OCOC$_4$H$_9$-n |
| 221 | 1,5 | CH$_3$ | CH$_3$ | OCOC$_6$H$_4$-4-CO$_2$CH$_3$ |
| 222 | 1,5 | CH$_3$ | CH$_3$ | OCO$_2$C$_6$H$_5$ |
| 223 | 1,5 | CH$_3$ | CH$_3$ | OCOCH$_2$OH |
| 224 | 1,5 | CH$_2$C$_6$H$_5$ | CH$_2$C$_6$H$_5$ | OH |

TABLE 7
RED ANTHRAQUINONES OF STRUCTURE VII

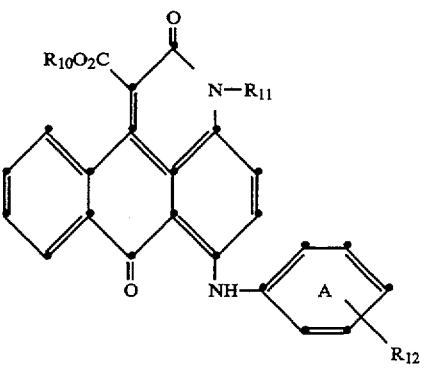

| Ex. No. | $R_{10}$ | $R_{11}$ | $R_{12}$ |
|---|---|---|---|
| 225 | $CH_3$ | $CH_3$ | H |
| 226 | $CH_2CH_3$ | $CH_3$ | 4-$CH_3$ |
| 227 | $CH_2CH_3$ | $CH_2CH(C_2H_5)C_4H_9$-n | H |
| 228 | $CH_3$ | $C_4H_9$-n | 4-Cl |
| 229 | $CH_2CH_3$ | $C_{12}H_{25}$ | 4-$CH_3$ |
| 230 | $CH_2CH_3$ | $CH_2CH_2OH$ | 4-$C_2H_5$ |
| 231 | $C_4H_9$-n | $CH_2CH_2OCOCH_3$ | 4-$OCH_3$ |
| 232 | $CH_2CH_3$ | $CH_3$ | 2-$OCH_3$-5-$CH_3$ |
| 233 | $CH_2CH_3$ | $CH_2CH_3$ | 2-$OCH_3$-5-Cl |
| 234 | H | $C_6H_{11}$ | 4-$C_2H_4OH$ |
| 235 | $CH_2CH_3$ | $CH_3$ | 4-$C_2H_4OH$ |
| 236 | $CH_2CH_3$ | $CH_2C(CH_3)_2CH_2OH$ | 4-$OC_2H_4OH$ |
| 237 | $CH_2CH_3$ | $C_6H_5$ | 4-$SC_2H_4OH$ |
| 238 | $CH_2CH_3$ | $CH_2C_6H_5$ | 4-$NHCOCH_3$ |
| 239 | $CH_2CH_3$ | $CH_2CH_2C_6H_5$ | 4-$NHCOC_2H_5$ |
| 240 | $CH_2CH_3$ | $CH_2CH_2OC_6H_5$ | 3-$NHCOCH_3$ |
| 241 | $CH_2CH_3$ | $CH_2CH_2CN$ | 3-$NHCOC_6H_5$ |
| 242 | $CH_2CH_3$ | $CH_2CH_2OCO_2C_2H_5$ | 3-$NHCOC_6H_4$-4-$OCH_3$ |
| 243 | $CH_2CH_3$ | $CH_2C(CH_3)_2CH_2OH$ | 4-$SC_6H_5$ |
| 244 | $CH_2CH_3$ | $CH_2C(CH_3)_2CH_2OH$ | 4-$SC_4H_9$-n |
| 245 | $CH_2CH_3$ | $CH_2C(CH_3)_2CH_2OH$ | 4-$NHSO_2CH_3$ |
| 246 | $CH_2CH_3$ | $CH_2C(CH_3)_2CH_2OH$ | 4-$NHSO_2C_6H_5$ |
| 247 | $C_6H_5$ | $CH_3$ | 4-$NHSO_2C_6H_4$-4-$CH_3$ |
| 248 | $C_6H_{11}$ | $CH_2CH(OH)CH_2OH$ | 4-$NHSO_2C_6H_4$-4-$OCH_3$ |
| 249 | $C_5H_9$ | $(CH_2)_4OH$ | 4-$NHSO_2C_2H_5$ |
| 250 | $C_4H_7$ | $CH_2C_6H_{10}$-4-$CH_2OH$ | 4-$NHCOCH_2C_6H_5$ |
| 251 | $CH_2CH_2OH$ | $CH_2CH_2OCONHC_6H_5$ | 4-$NHCOCH_2OC_6H_5$ |
| 252 | $CH_2CH_2OCH_2CH_3$ | $C_8H_{17}$ | 4-$NHCOC(CH_3)_3$ |
| 253 | $CH_2CH_2OC_6H_5$ | $C_6H_4$-4-$CO_2CH_3$ | 4-$OC_2H_4OCOCH_3$ |

TABLE 8
RED ANTHRAQUINONES OF STRUCTURE VIII

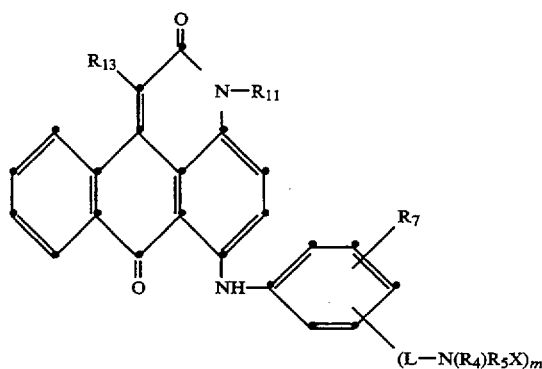

| Ex. No. | L | $R_4$ | $R_5$ | $R_7$ | $R_{11}$ | $R_{13}$ | X | m |
|---|---|---|---|---|---|---|---|---|
| 254 | 3-$SO_2$— | H | —$CH_2CH_2$— | H | $CH_3$ | H | OH | 1 |
| 255 | 3-$SO_2$— | —$CH_2CH_2OH$ | —$CH_2CH_2$— | H | $CH_3$ | H | OH | 1 |
| 256 | 5-$SO_2$— | —$CH_3$ | —$CH_2CH_2$— | 2-$OCH_3$ | $CH_3$ | H | $OCOCH_3$ | 1 |

TABLE 8-continued

RED ANTHRAQUINONES OF STRUCTURE VIII

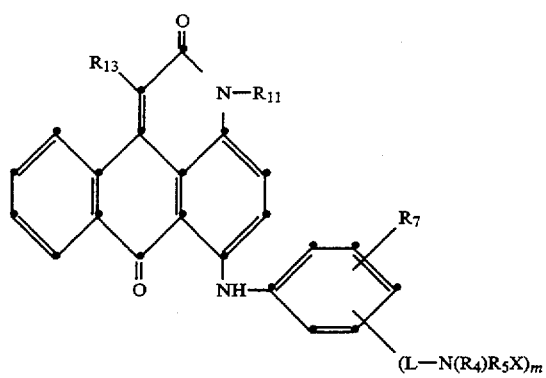

| Ex. No. | L | $R_4$ | $R_5$ | $R_7$ | $R_{11}$ | $R_{13}$ | X | m |
|---|---|---|---|---|---|---|---|---|
| 257 | 5-$SO_2$— | —$CH_2CH_2OH$ | —$CH_2CH_2$— | 2-$CH_3$ | $CH_3$ | H | OH | 1 |
| 258 | 5-$SO_2$— | —$CH_2CH_3$ | —$CH_2CH_2$— | 2-$OC_2H_5$ | $C_4H_9$-n | H | OH | 1 |
| 259 | 3-$SO_2$— | H | —$CH_2CH_2$— | H | $CH_3$ | $CO_2C_2H_5$ | OH | 1 |
| 260 | 2(3)-$SO_2$— | H | —$CH_2CH_2$— | 4-$CH_3$ | $CH_3$ | $CO_2C_2H_5$ | OH | 1 |
| 261 | 3-$SO_2$— | H | -1,4-$C_6H_4$— | H | $CH_3$ | $CO_2C_2H_5$ | $CO_2CH_3$ | 1 |
| 262 | 3-CO— | H | -1,3-$C_6H_4$— | H | $CH_3$ | $CO_2C_2H_5$ | $CO_2C_2H_5$ | 1 |
| 263 | 3-CO— | $CH_2CH_2OH$ | —$CH_2CH_2$— | H | $C_{12}H_{25}$-n | H | OH | 1 |
| 264 | 3-CO— | H | —$CH_2$— | H | $CH_3$ | $CO_2C_2H_5$ | $CO_2C_2H_5$ | 1 |
| 265 | 3-CO— | $CH_3$ | —$CH_2CH_2$— | H | $CH_2CH_2C_6H_5$ | CN | OH | 1 |
| 266 | 3-$SO_2$— | H | —$CH_2CH_2$— | H | $CH_2C_6H_5$ | CN | OH | 1 |
| 267 | 3-$SO_2$— | $C_2H_5$ | —$CH_2CH_2$— | H | $CH_3$ | CN | OH | 1 |
| 268 | 3-CO— | H | -1,2-$C_6H_4$— | H | $CH_3$ | CN | $CO_2CH_3$ | 1 |
| 269 | 4-$SO_2$— | H | -1,3-$C_6H_4$— | H | $CH_2CH_2OCOCH_3$ | CN | $CO_2CH_3$ | 1 |
| 270 | 4-CO— | H | -1,4-$C_6H_4$— | H | $C_6H_{11}$ | CN | $CO_2CH_3$ | 1 |
| 271 | 4-CO— | H | -1,3-$C_6H_4$— | H | $C_6H_5$ | CN | $CO_2CH_3$ | 1 |
| 272 | 4-CO— | H | —$CH_2CH_2OCH_2CH_2$— | H | $CH_2C(CH_3)_2CH_2OH$ | CN | OH | 1 |
| 273 | 3-$SO_2$— | H | —$CH_2$-1,4-$C_6H_4$— | H | $CH_3$ | CN | $CO_2CH_3$ | 1 |
| 274 | 3-$SO_2$— | H | —$CH_2$—$C_6H_{10}$-4-$CH_2$— | H | $CH_2C(C_2H_5)C_4H_9$-n | CN | OH | 1 |
| 275 | — | — | — | 4-$CH_2CH_2OH$ | $CH_3$ | H | — | 1 |
| 276 | — | — | — | 4-$OCH_2CH_2OH$ | $CH_3$ | H | (—) | 1 |

— Indicates no substituent present

TABLE 9

RED ANTHRAQUINONES OF STRUCTURE IX

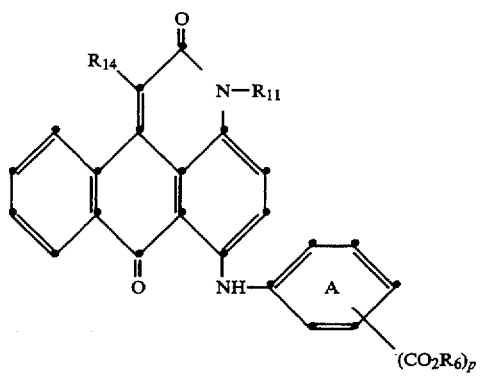

| Ex. No. | Position of —$CO_2R_6$ on Ring A | $R_6$ | $R_{11}$ | $R_{14}$ | p |
|---|---|---|---|---|---|
| 277 | 3 | $CH_3$ | $CH_3$ | H | 1 |
| 278 | 4 | $CH_2CH_3$ | $CH_2CH_3$ | H | 1 |
| 279 | 2 | H | $C_4H_9$-n | H | 1 |
| 280 | 3,5-di- | $CH_3$ | $C_{12}H_{25}$-n | H | 2 |
| 281 | 3 | $CH_2CH_2OH$ | $CH_2CH(C_2H_5)C_4H_9$-n | H | 1 |
| 282 | 4 | $CH_2CH_2OCH_2CH_3$ | $CH_3$ | $CO_2C_2H_5$ | 1 |
| 283 | 3 | $CH_2CH_2OCH_2CH_2OH$ | $CH_3$ | $CO_2C_2H_5$ | 1 |
| 284 | 3,5-di- | $CH_3$ | $CH_3$ | $CO_2CH_3$ | 2 |
| 285 | 4 | $CH_2CH(OH)CH_2OH$ | $C_6H_{11}$ | $CO_2C_6H_5$ | 1 |
| 286 | 3 | $CH_2C_6H_{11}$ | $CH_2C_6H_5$ | $CO_2C_6H_{11}$ | 1 |
| 287 | 2 | $(CH_2CH_2O)_3H$ | $CH_3$ | H | 1 |

TABLE 9-continued
RED ANTHRAQUINONES OF STRUCTURE IX

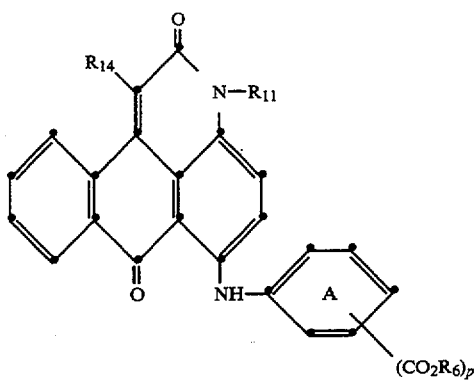

| Ex. No. | Position of $-CO_2R_6$ on Ring A | $R_6$ | $R_{11}$ | $R_{14}$ | p |
|---|---|---|---|---|---|
| 288 | 4 | $CH_3$ | $CH_3$ | CN | 1 |
| 289 | 2 | $CH_2CH_3$ | $CH_2CH_2C_6H_5$ | CN | 1 |
| 290 | 3 | $C_6H_5$ | $CH_3$ | CN | 1 |
| 291 | 3 | $CH_2-C_6H_4-4-CH_2OH$ | $CH_3$ | CN | 1 |
| 292 | 3 | $CH_2CH_2SCH_2CH_2OH$ | $CH_3$ | CN | 1 |
| 293 | 3 | $CH_2CH_2OCOCH_3$ | $CH_3$ | CN | 1 |
| 294 | 3 | $CH_2CH(OCOCH_3)CH_2OCOCH_3$ | $CH_3$ | CN | 1 |
| 295 | 3 | $C_2H_5$ | $CH_2C(CH_3)_2CH_2OH$ | CN | 1 |
| 296 | 4 | $CH_3$ | $CH_2C(CH_3)_2OCOCH_3$ | CN | 1 |
| 297 | 2 | $CH_3$ | $CH_2C_6H_{10}-4-CH_2OH$ | CN | 1 |
| 298 | 3 | $CH_3$ | $CH_2CH_2CH_2OC_6H_5$ | CN | 1 |
| 299 | 3 | $CH_2CH_2OCO_2CH_3$ | $CH_2C_6H_4-4-CO_2CH_3$ | CN | 1 |

TABLE 10
RED ANTHRAQUINONES OF STRUCTURE X

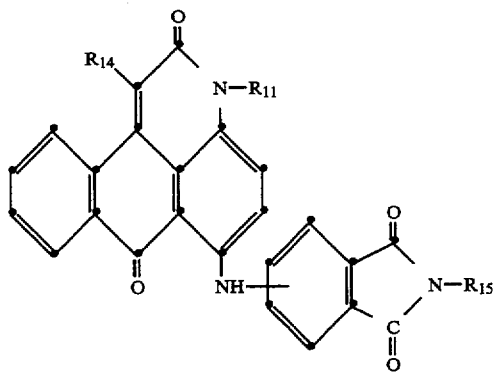

| Ex. No. | Position of $-NH-$ on Phthalimide Ring | $R_{11}$ | $R_{14}$ | $R_{15}$ |
|---|---|---|---|---|
| 300 | 4 | $CH_3$ | H | $CH_2CH_2OH$ |
| 301 | 4 | $CH_3$ | $CO_2C_2H_5$ | $CH_2CH_2OH$ |
| 302 | 4 | $CH_3$ | $CO_2CH_3$ | $CH_2CH(OH)CH_2OH$ |
| 303 | 3 | $CH_3$ | $CO_2C_2H_5$ | $(CH_2)_4OH$ |
| 304 | 3 | $CH_2CH_2OH$ | H | $CH_2C_6H_4-4-CO_2CH_3$ |
| 305 | 4 | $CH_2C(CH_3)_2CH_2OH$ | CN | H |
| 306 | 4 | $CH_2CH_2OCOCH_3$ | CN | $C_2H_5$ |
| 307 | 4 | $C_6H_{11}$ | CN | $CH_2CH_2OCOCH_3$ |
| 308 | 3 | $CH_2CH_2C_6H_5$ | CN | $CH_2CH_2OCOC_2H_5$ |
| 309 | 3 | $C_{12}H_{25}$ | CN | $CH_2CH_2OCOC_6H_5$ |
| 310 | 4 | $C_{12}H_{25}$ | CN | $CH_2CH_2OH$ |
| 311 | 4 | H | H | $C_6H_9-4-CO_2CH_3$ |
| 312 | 4 | $CH_2CH(C_2H_5)C_4H_9$ | $CO_2C_2H_5$ | $C_6H_5$ |
| 313 | 3 | $C_4H_9-n$ | $CO_2CH_3$ | $C_6H_{11}$ |
| 314 | 4 | $CH_2CH_2OCH_2CH_3$ | CN | $C_6H_3-3,5di-CO_2CH_3$ |
| 315 | 4 | $CH_3$ | CN | $CH_2CH_2COOH$ |
| 316 | 4 | $CH_3$ | CN | $CH_2CH_2CO_2C_2H_5$ |
| 317 | 4 | $CH_3$ | CN | $CH_2CH_2OCH_2CH_2OH$ |
| 318 | 4 | $CH_3$ | CN | $CH_2C_6H_{10}-4-CH_2OH$ |

TABLE 10-continued
RED ANTHRAQUINONES OF STRUCTURE X

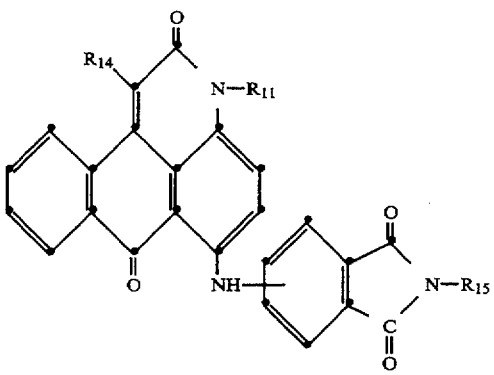

| Ex. No. | Position of —NH— on Phthalimide Ring | $R_{11}$ | $R_{14}$ | $R_{15}$ |
|---|---|---|---|---|
| 319 | 4 | $CH_3$ | CN | $CH_2OC_6H_4$-4-$CO_2CH_3$ |
| 320 | 4 | $CH_3$ | CN | $CH_2CH_2OC_6H_4$-3-COOH |
| 321 | 4 | $CH_3$ | CN | $C_6H_4$-2-$CO_2CH_3$ |
| 322 | 4 | $CH_3$ | CN | $C_6H_4$-3-$CO_2CH_3$ |

TABLE 11
POLYESTER COMPOSITIONS CONTAINING TONERS

| Example No. | Blue Compound | Red Compound | IV | Rd | Color a | Color b |
|---|---|---|---|---|---|---|
| Comparative Example 1 | None | None | 0.74 | 51.9 | −2.29 | 3.18 |
| 323 | Example 1 (3.0 ppm) | Example 10 (1.68 ppm) | 0.75 | 48.3 | −0.94 | −0.03 |
| 324 | Example 1 (3.0 ppm) | Example 93 of Table 2 (1.5 ppm) | 0.72 | 47.6 | −0.42 | −0.58 |
| 325 | Example 1 (3.0 ppm) | Example 12 (2.0 ppm) | 0.74 | 46.3 | −0.99 | −0.39 |
| 326 | Example 1 (3.3 ppm) | Example 12 (2.2 ppm) | 0.74 | 44.2 | −0.97 | −0.08 |
| 327 | Example 1 (1.3 ppm) | Example 13 (2.0 ppm) | 0.75 | 48.3 | −1.31 | −0.31 |
| 328 | Example 1 (1.5 ppm) | Example 14 (2.5 ppm) | 0.76 | 43.7 | −0.92 | −0.90 |
| 329 | Example 1 (3.0 ppm) | Example 14 (5.0 ppm) | 0.75 | 40.3 | −0.33 | −3.67 |
| 330 | Example 1 (1.125 ppm) | Example 16 (2.25 ppm) | 0.71 | 44.6 | −1.34 | −0.58 |
| 331 | Example 1 (1.5 ppm) | Example 15 (3.0 ppm) | 0.76 | 46.7 | −0.71 | −0.42 |
| Comparative Example 1 | None | None | 0.74 | 51.9 | −2.29 | 3.18 |
| 332 | Example 1 (1.0 ppm) | Example 17 (3.0 ppm) | 0.75 | 49.1 | −0.93 | −1.29 |
| 333 | Example 1 (0.83 ppm) | Example 17 (2.5 ppm) | 0.72 | 43.5 | −1.37 | −0.38 |
| 334 | Example 1 (1.67 ppm) | Example 15 (2.5 ppm) | 0.73 | 44.4 | −0.70 | −0.11 |
| 335 | Example 1 (1.41 ppm) | Example 16 (2.81 ppm) | 0.75 | 46.8 | −1.19 | 0.13 |
| 336 | Example 1 (1.3 ppm) | Example 13 (2.0 ppm) | 0.66 | 45.2 | −1.47 | −0.49 |
| 337 | Example 1 (2.0 ppm) | Example 18 (2.5 ppm) | 0.71 | 46.9 | −0.87 | −0.42 |
| 338 | Example 1 (3.31 ppm) | Example 10 (1.87 ppm) | 0.67 | 46.8 | −0.87 | −0.99 |
| Comparative Example 1 | None | None | 0.74 | 51.9 | −2.29 | 3.18 |
| 339 | Example 5 (3.5 ppm) | Example 93 of Table 2 (1.0 ppm) | 0.70 | 40.6 | −1.01 | −2.00 |
| 340 | Example 1 (3.44 ppm) | Example 202 of Table 6 (1.25 ppm) | 0.72 | 48.3 | −1.19 | 0.50 |
| 341 | Example 1 (3.44 ppm) | Example 260 of Table 8 (1.25 ppm) | 0.73 | 49.4 | −2.19 | 1.49 |
| 342 | Example 1 (3.44 ppm) | Example 123 of Table 3 (1.25 ppm) | 0.75 | 48.0 | −1.66 | 1.10 |
| 343 | Example 9 (4.125) | Example 21 (1.75 ppm) | 0.70 | 49.3 | −1.04 | −0.91 |

TABLE 12
POLY(ETHYLENE TEREPHTHALATE) COMPOSITIONS

| Example No. | Blue Compound | Red Compound | IV | L* | a* | b* |
|---|---|---|---|---|---|---|
| 344 | Example 1 (3.3 ppm) | Example 10 (1.86 ppm) | 0.65 | 84.8 | −0.72 | −0.14 |
| 345 | Example 8 (4.0 ppm) | Example 11 (2.0 ppm) | 0.61 | 83.4 | −0.28 | −1.00 |
| 346 | Example 9 (4.5 ppm) | Example 21 (2.0 ppm) | 0.58 | 83.8 | −0.60 | −1.45 |

We claim:

1. A molding or fiber grade polyester having copolymerized therein, in an amount sufficient to improve the apparent whiteness of the polyester, at least one blue 1,4-bis(2,6-dialkylanilino) anthraquinone compound of Formula (I)

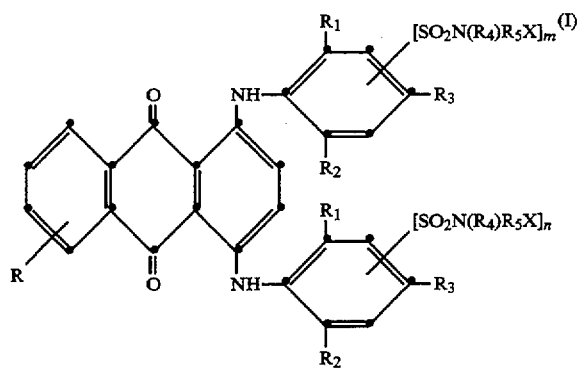

wherein:

R is selected from the group consisting of hydrogen, $C_1$–$C_6$ alkyl, halogen, carboxy, and $C_1$–$C_6$

$R_1$ and $R_2$ are independently $C_1$–$C_6$-alkyl;

$R_3$ is selected from the group consisting of hydrogen, halogen, $C_1$–$C_6$-alkyl, substituted $C_1$–$C_6$ alkyl, hydroxy, $C_1$–$C_6$-alkoxy, substituted $C_1$–$C_6$-alkoxy, cyano, thiocyano, $C_1$–$C_6$-alkylthio, substituted $C_1$–$C_6$-alkylthio, $C_1$–$C_6$-alkylsulfonyl, substituted $C_1$–$C_6$-alkylsulfonyl, $C_1$–$C_6$-alkoxycarbonyl, carboxy, aryloxy, arylthio, arylsulfonyl, and $SO_2N(R_4)R_5X$ when m and/or n are zero;

$R_4$ is selected from the group consisting of hydrogen, $C_1$–$C_6$-alkyl, substituted $C_1$–$C_6$-alkyl, $C_3$–$C_8$-alkenyl, $C_3$–$C_8$-alkynyl, $C_3$–$C_7$-cycloalkyl and aryl;

$R_5$ is a linking group selected from the group consisting of $C_1$–$C_8$-alkylene, $C_1$–$C_6$-alkylene-Z—$C_1$–$C_6$-alkylene, arylene-$C_1$–$C_6$-alkylene, arylene-Z—C-$_1$–$C_6$ alkylene, $C_3$–$C_7$-cycloalkylene, $C_1$–$C_6$-alkylene-cycloalkylene-$C_1$–$C_6$-alkylene, $C_1$–$C_6$-alkylene-arylene-$C_1$–$C_6$-alkylene, and $C_1$–$C_6$-alkylene-Z-arylene-Z—$C_1$–$C_6$-alkylene, wherein Z is selected from —O—, —S— and $SO_2$;

X is hydrogen or a polyester reactive group; and m and n are independently 0 or 1; with the proviso that at least one polyester reactive group is present; along with at least one red anthraquinone or anthrapyridone compound selected from formulae (II)–(X) below:

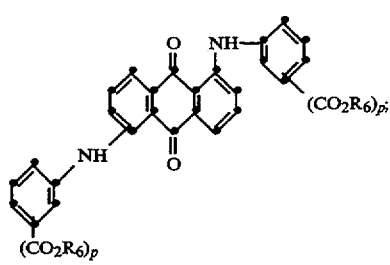

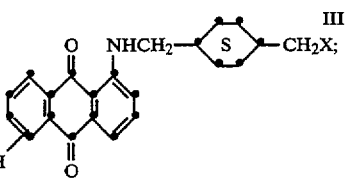

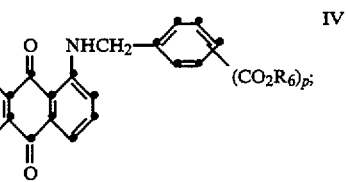

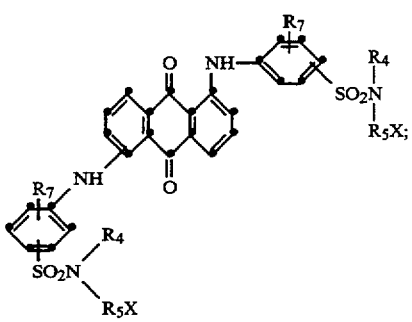

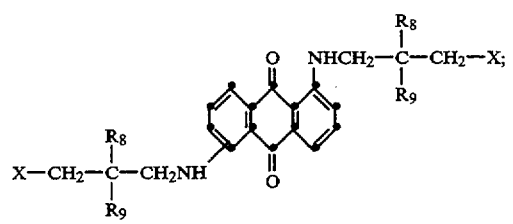

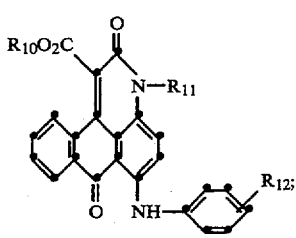

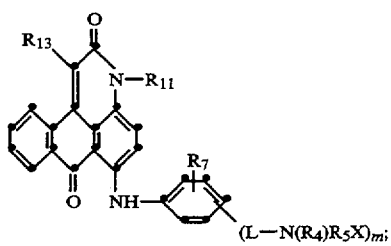

-continued

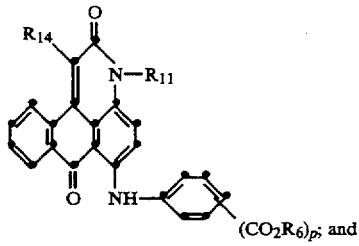

(CO₂R₆)ₚ; and

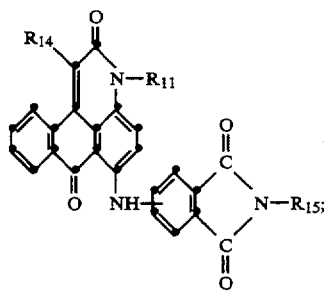

wherein:
R₆ is selected from the group consisting of hydrogen, $C_1$–$C_6$-alkyl, substituted $C_1$–$C_6$-alkyl, $C_3$–$C_7$-cycloalkyl and aryl;
R₇ is hydrogen or one to three groups selected from $C_1$–$C_6$-alkyl, $C_1$–$C_6$-substituted alkyl, $C_1$–$C_6$-alkanoylamino, halogen, $C_1$–$C_6$-alkyl $C_1$–$C_6$-alkoxy, $C_1$–$C_6$-alkylthio;
R₈ and R₉ are the same or different and are selected from the group consisting of $C_1$–$C_6$-alkyl, substituted $C_1$–$C_6$-alkyl, $C_3$–$C_7$-cycloalkyl and aryl;
R₁₀ is selected from the group consisting of $C_1$–$C_6$-alkyl, $C_3$–$C_7$-cycloalkyl and aryl;
R₁₁ is selected from the group consisting of hydrogen, $C_1$–$C_{12}$-alkyl, substituted $C_1$–$C_{12}$-alkyl, $C_3$–$C_7$-cycloalkyl and aryl;
R₁₂ is hydrogen or one to three groups selected from the group consisting of $C_1$–$C_6$-alkyl, substituted $C_1$–$C_6$-alkyl, $C_1$–$C_6$-alkoxy, substituted $C_1$–$C_6$-alkoxy, $C_1$–$C_6$-alkylthio, substituted $C_1$–$C_6$-alkylthio, halogen, hydroxy, $C_1$–$C_6$-alkanoylamino, aroylamino, $C_1$–$C_6$-alkylsulfonylamino and arylsulfonylamino;
R₁₃ and R₁₄ are selected from hydrogen, cyano and CO₂R₁₀;
R₁₅ is R₄ or R₅X as previously defined;
L is —CO— or —SO₂—; X is as previously defined; m is 0 or 1; and p is 1 or 2; with the provisos that R₁₃ is hydrogen when m is 0 and at least one polyester reactive group is present.

2. The polyester of claim 1, wherein the blue anthraquinone compound(s) correspond to structure (I) above, wherein R is hydrogen; R₁ and R₂ are independently selected from methyl and ethyl; R₃ is hydrogen, methyl, or bromo; R₄ is hydrogen, $C_1$–$C_4$-alkyl and aryl; R₅ is selected from the group consisting of $C_1$–$C_6$-alkylene, $C_1$–$C_4$-alkylene-O—$C_1$–$C_4$-alkylene, —CH₂C₆H₁₀CH₂—, arylene, or —CH₂-arylene- and the red component corresponds to formulae (V), wherein R₇ is $C_1$–$C_6$-alkoxy and R₄ and R₅ are as defined in claim 1.

3. The polyester of claim 1, wherein the concentration of blue and red compounds taken together is from about 0.5 ppm to about 10 ppm.

4. The polyester of claim 1, wherein the total concentration of blue compound(s) is about 1 to 7 ppm and the concentration of red compound(s) is about 0.5 to 3 ppm.

5. The polyester of claim 1, wherein the compound of formula (I) is

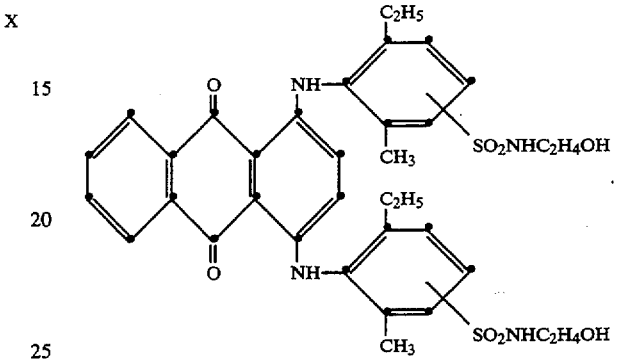

6. The polyester of claim 1, wherein the compound of formula (I) is

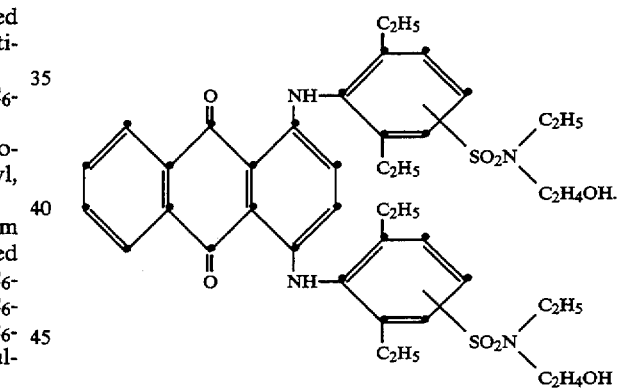

7. The polyester of claim 1, wherein the red compound of formula (V) is

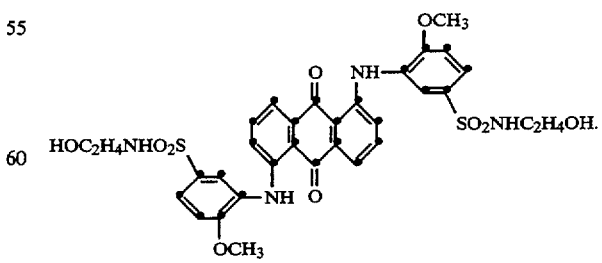

8. The polyester of claim 1, wherein the red compound of formula (V) is

9. The polyester of claim 1, wherein the blue compound of formula (I) is

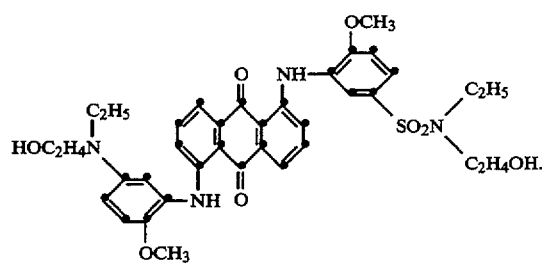

and wherein the red compound of formula (V) is

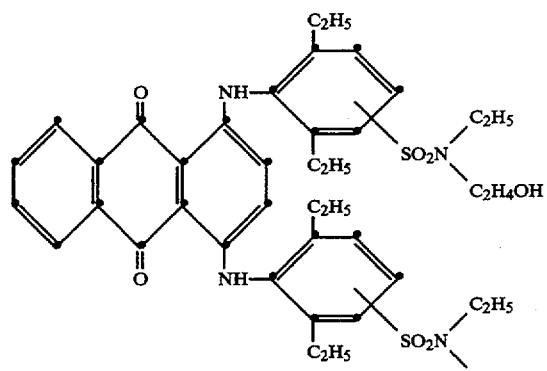

10. The polyester of claim 1, wherein the red compound of formula (II) is

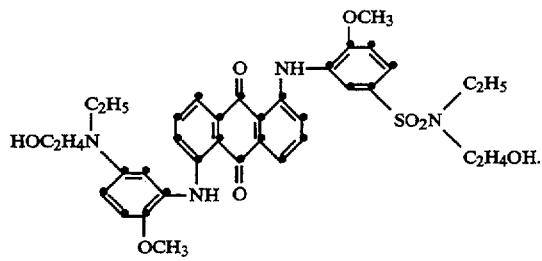

11. The polyester of claim 1, wherein the red compound of formula (III) is

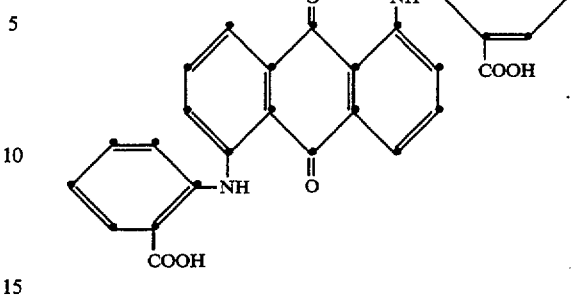

12. The polyester of claim 1, wherein the red compound of formula (VI) is

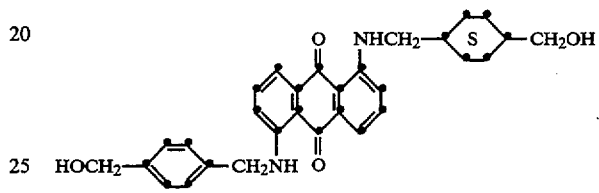

13. The polyester of claim 1, wherein the red compound of formula (VIII) is

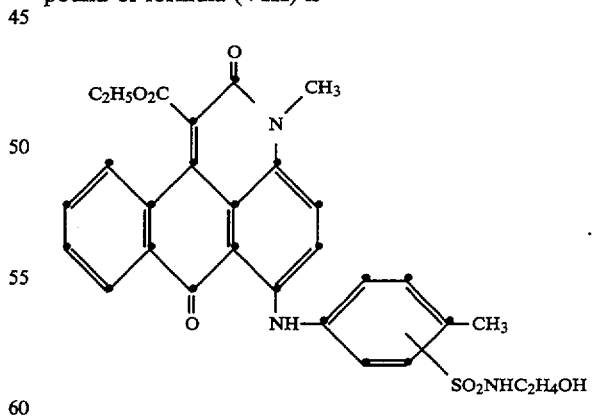

14. A shaped or formed article comprised of the polyester of claim 1.

15. A container comprised of the polyester of claim 1.

* * * * *